US006307837B1

(12) United States Patent
Ichikawa et al.

(10) Patent No.: US 6,307,837 B1
(45) Date of Patent: Oct. 23, 2001

(54) METHOD AND BASE STATION FOR PACKET TRANSFER

(75) Inventors: Takeo Ichikawa; Hidetoshi Kayama; Hiroyuki Yamamoto; Hitoshi Takanashi; Masahiro Morikura, all of Tokyo (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 09/132,148

(22) Filed: Aug. 10, 1998

(30) Foreign Application Priority Data

Aug. 12, 1997 (JP) .................................................... 9-228966

(51) Int. Cl.[7] ...................................................... H04L 1/00
(52) U.S. Cl. ........................................... 370/230; 370/401
(58) Field of Search ............................... 380/247, 29, 270, 380/283; 709/227; 713/153, 160, 161, 201; 370/230, 401

(56) References Cited

U.S. PATENT DOCUMENTS

| 5,124,984 | * | 6/1992 | Engel ..................................... 370/230 |
| 5,199,072 | * | 3/1993 | White et al. ........................... 380/44 |
| 5,638,448 | * | 6/1997 | Nguyen .................................. 380/29 |
| 5,659,615 | * | 8/1997 | Dillon .................................... 380/270 |
| 5,689,566 | * | 11/1997 | Nguyen ................................. 380/29 |
| 5,757,924 | * | 5/1998 | Friedman et al. .................... 380/283 |
| 5,790,548 | * | 8/1998 | Sistanizadeh et al. .............. 370/401 |
| 6,047,325 | * | 4/2000 | Jain et al. ............................. 709/227 |
| 6,081,900 | * | 6/2000 | Subramaniam et al. ............ 713/201 |

FOREIGN PATENT DOCUMENTS

| 2-302139 | 12/1990 | (JP) . |
| 5-327773 | 12/1993 | (JP) . |
| 7-79243 A | 3/1995 | (JP) . |
| 9-252323 A | 9/1997 | (JP) . |

* cited by examiner

Primary Examiner—Salvatore Cangialosi
(74) Attorney, Agent, or Firm—Pennie & Edmonds LLP

(57) ABSTRACT

A method of packet transfer is provided to resolve the problem of fraudulent access to user LANs through falsified source address so that only those pre-registered terminals are permitted to transfer packets with specific data networks. Each user LAN is assigned an identifier to identify respective user LAN beforehand. Packet network stores terminal information including terminal addresses, identifiers assigned to one and more user LANs that are permitted to communicate with each packet terminal and information necessary for terminal authentication beforehand. When the packet terminal starts a communication through a base station, the packet network authenticates the packet terminal, and if it is an unauthorized terminal, the packet network informs a denial for communication to the packet terminal. If an allowance for communication is obtained by authentication, the packet terminal encrypts data to be transmitted and sends a packet to the packet network with an attachment containing the encrypted data, identifiers for the selected user LAN among one and more user LANs, the destination address and the source address. Packet network receives the packet, and while decoding the encrypted data included in the received packet, detects tampering, and if tampering is detected, the received packet is discarded, but if there is no tampering, it checks whether the identity of source address and the identifier is registered in the terminal information, and if the identity is registered, the received packet is sent to the destination address, and if the identity is not registered, the received packet is discarded.

24 Claims, 22 Drawing Sheets

FIG.5

| DESTINATION ADDRESS 4-1 | SOURCE ADDRESS 4-2 | VLAN-ID 4-3 | USER DATA 4-4 (ENCRYPTION AREA) |

METHOD AND BASE STATION FOR PACKET TRANSFER

BACKGROUND OF THE INVENTION

1. Field of the Invention

The present invention relates in general to a packet transfer method and a base station for using it in wireless or wired packet communication. More particularly, the present invention relates to a packet transfer method for a connection-less type data communication in a network composed of a packet network and a plurality of local area networks (LAN) forming a virtual LAN (VLAN), and also to a base station for use in such method. The present invention is based on a Patent Application, Hei9-228966 filed in Japan, content of which is incorporated herein by reference.

2. Description of the Related Art

Internet is based on Internet Protocol (IP) for its packet transfer method so that each terminal has an IP address. IP address is a 32-bit address in which a part of the upper bits shows the network address for identifying the data network, and the remaining lower bits show the host address for identifying the terminal connecting to the data network.

The connecting terminal transmits a packet comprised by data and attachment including the destination address and the source address to the IP network, which transfers the packet to a data network indicated by the network address included in the destination address. When the packet is a unicast packet, the data network transmits the packet to a terminal specified by the host address shown in the destination address. While when the packet is a broadcast packet, the data network transmits the packet to all terminals connected to the data network (RFC791 Internet Protocol).

However, such a packet transfer method is designed to transmit the packet to the data network without confirming the identity of the source terminal, so that there is a danger of an unknown terminal accessing the data network inappropriately. Also, even when the source terminal is an authorized terminal, because the destination address is not regulated, there is a problem that it is not possible to prevent the source terminal from accessing other data network to which the source terminal does not belong and is not approved for accessing.

To resolve such difficulties, a packet transfer method is proposed to check the addresses of both the receiver and the sender at the time of packet transfer.

According to this address checking method, sets of transfer-allowed destination addresses and the source addresses are pre-registered in the packet transfer device in a permission table. Packet transfer device checks destination address and source address in the transferred packet, and if the addresses are registered in the permission table, the transferred packet is transmitted, but will not be transmitted if the addresses are not registered in the table (Takahiro Ishizaka, "Network Security Device", Japanese Patent Application, First Publication, Hei 2-302139).

According to this method, the source address is confirmed and only those terminals that have permitted terminal addresses can receive transmission, therefore, inappropriate access to the data network is prevented. However, this method does not prevent counterfeit source address to be used for fraudulent access to the data network.

Other proposed packet transfer methods include forced transmission method. According to this method, when a call is accessed through a packet network of the connection oriented type (i.e., packet network typically follows X.25 protocol to setup a connection when communication is to be started) connected to a plurality of data networks, the packet network forces the call to route to a database machine for security checks. The database machine checks the legitimacy of the accessed call, and when it is legitimate, the call is transferred to the data network to establish a connection between the data network and the terminals, and if it is illegitimate, the call is terminated (Shouji Oyoshi, "Security checking method in packet exchange network, Japanese Patent Application, First Publication, Hei5-327773).

However, when the above method is applied to a connection-less type packet network which carries out transfer according to the destination address attached to a packet, all the transfer packets are coerced to route to the database machine for security checks to check their access legitimacy. This approach creates problems of increasing the load on the database machine for security checks and increasing the packet transmission delay time.

Other types of packet transfer methods include encapsulation technique which utilizes a network system (referred to as relay network), such as Internet, to allow a plurality of unspecified remote terminals to access to a data network while preventing illegitimate access to the data network from unauthorized packet terminals. In this method, the data network connects to the relay network through gateways. At the time of starting the communication process, the gateway authenticates the identity of the remote terminal, and if it is found that the remote terminal has not been authorized, the packet is discarded. Next, remote terminal transmits a sender packet, containing an encrypted destination address and an encrypted source address, to the gateway. At this time, the encrypted sender packet is stored in the data section of the packet addressed to the gateway, and is sent with an attachment containing the address of the gateway connected to the destination network and the source address. The capsulated packet is sent to the relay network. This type of packet transfer method is called an encapsulation method. The destination gateway retrieves the data section from the received packet, and decodes the encrypted packet. If it detects tampering while decoding, the capsulated packet is discarded and if it does not detect any tampering, the capsulated packet is transferred to the data network. As for the packet sent from the data network to the remote terminal, the gateway connected to the source data network attaches the destination address and the source address, and, after encrypting, further attaches the destination address and dedicated gateway address to the capsule packet, and transfers the entire capsule to the remote terminal.

According to this method, after confirming the authenticity of the remote terminal, an encrypted path for the capsule is established between the gateway and the remote terminal to prevent fraudulent access to the data network. However, if the remote terminal wishes to transmit the packet to other remote terminals connected to the relay network, the packet is always sent through the gateway, therefore, optimal path cannot always be selected and the packet transmission delay time is increased. Also, it is necessary for the gateway to encapsulate and decapsulate packets for all the terminals that belong to data networks connecting to the gateway, therefore, processing load on the gateway is increased. Also, when the data network or remote terminals are attempting to transmit broadcast packet or multicast packet, this method does not allow inclusion of broadcast or multicast addresses in the destination address of the packet sent to the relay network. Therefore, the gateway can only duplicate the packet and unicast the packet to each remote terminal causing traffic congestion in the relay network, packet transfer time delay in addition to increase in the gateway load. Furthermore, when sending a unicast packet from a source remote terminal to destination remote terminals, even when these remote terminals are connected to a relay network, the packet is always handled through the gateway connected to the data network before the packet is sent to the addressed terminal, thus causing a problem that the transfer time delay is increased.

SUMMARY OF THE INVENTION

It is a first object of the present invention to a solve a problem of fraudulent access to a user LAN through a falsified source address by providing a packet transfer method and associated base stations that allow only those terminals which are registered beforehand to access certain data networks.

It is a second object of the present invention to solve a problem of increasing packet transfer delay time, traffic congestion and loading on gateways by providing an efficient packet transfer method and associated base stations that enable to select an optimum transfer path.

In the first to third aspects of the invention, the packet network is comprised by base stations and a packet backbone network connecting these base stations which accommodates a plurality of packet terminals, where the packet backbone network is also connected to other packet networks served by a plurality of user LANs. In the present packet network, each packet terminal has a specific terminal address, and the packet terminal forwards a packet to the packet network with an attachment including a terminal address of a destination terminal as destination address and a terminal address of the packet terminal as source address, and the packet network delivers the packet to the specified destination address.

In the first aspect of the invention, each user LAN is provided with an identifier to identify a user LAN. When the packet terminal starts a communication through the base station, the packet network performs authentication of the packet terminal, and upon receiving an approval, the packet terminal encrypts data to be sent and a packet containing the encrypted data with an attachment including an identifier assigned to the user LAN serving the destination terminal, a destination address and a source address is sent to the packet network. Upon receipt of the packet, the packet network decodes the encrypted data in the received packet, and if the received packet has not been tampered, and forwards the received packet to the specified user LAN based on the source address and the identifier included in the received packet, only when the packet terminal is approved for communicating with the user LAN specified by the identifier. If the packet terminal is not an authorized terminal, the received packet is discarded.

In the second aspect of the invention, each user LAN has already been assigned with an identifier for identifying a user LAN, and the packet network has already stored terminal information comprising terminal addresses, identifiers of one and more user LANs which are approved communication for serving packet terminals and information necessary for terminal authentication. Upon communication startup of the packet terminal through the base station, the packet network performs authentication of the packet terminal, and if it is an authorized terminal, the packet network issues an approval for communication. The packet terminal encrypts data to be transmitted, and a packet containing encrypted data and an attachment including the identifier of a user LAN selected from one and more user LANs, a destination address and a source address are forwarded to the packet network. Upon receiving the packet, the packet network decodes the encrypted data in the received packet, and if it is tampered, the received packet is discarded, and if it is not tampered, the packet network checks whether the identity of the source address and the identifier in the received packet is registered in the terminal information, and if it is registered, the received packet is sent to the destination address, and if it is not registered, the received packet is discarded.

In the third aspect of the invention, each user LAN has already been assigned with a specific user LAN-name. Packet network has already stored terminal information comprising terminal addresses, user LAN-names assigned to one and more user LANs which are approved for serving packet terminals and information necessary for terminal authentication. Upon communication startup of the packet terminal through the base station, the packet terminal informs the packet network of the user LAN-name assigned to a user LAN selected from one and more user LANs. The packet network performs authentication of the packet terminal, and if it is an authorized terminal, the packet network assigns an identifier for identifying each user LAN to the user LAN-name informed from the packet terminal, and issues the identifier to the packet terminal. Then, the packet terminal encrypts data to be sent, and a packet containing the encrypted data and an attachment including a user LAN-name assigned to the user LAN selected, a destination address and a source address are forwarded to the packet network. Upon receiving the packet, the packet network decodes the encrypted data in the received packet, and if it is tampered, the received packet is discarded, and if it is not tampered, the packet network checks whether the identity of the user LAN-name assigned with the identifier included in the received packet and the source address included in the received packet is registered in the terminal information, and if the identity is registered, the packet network transfers received packet to the destination address, otherwise discarding the received packet. When the packet terminal has been completed packet communication, the packet network releases the identifier assigned to the user LAN-name.

On the other hand, the fourth and fifth aspects of the invention relate to a base station which is connected to a packet backbone network connected to other packet networks served user LANs and accommodate a plurality of packet terminals.

In the fourth aspect of the invention, a terminal information memory section includes specific terminal addresses assigned to each packet terminal, identifiers assigned to each of one and more user LANs approved for communicating with each packet terminal, and information necessary for terminal authentication. In response to a communication startup request from the packet terminal, a terminal authentication section authenticates the packet terminal and notifies an authentication result. The packet terminal transmits a packet containing an encrypted data with an attachment including a terminal address of a destination terminal as a destination address, a terminal address of the packet terminal as a source address, and an identifier assigned to a user LAN selected from one and more user LANs. Then, a packet decoding section decodes the encrypted data included in the packet, and if a tampering detection section detects tampering based on the decoded data, it discards the packet. A comparison section confirms whether a set of source address and identifier attached in the packet is registered in a plurality of sets of terminal addresses and identifiers stored in the terminal information memory section. Based on a result of confirmation, a filtering section decides whether to transfer the packet to the destination address or to discard the packet.

In the fifth aspect of the invention, a terminal information memory section includes specific terminal addresses assigned to each packet terminal, user LAN-names assigned to each of one and more user LANs approved for communicating with each packet terminal, and information necessary for terminal authentication. In response to a communication startup request from the packet terminal, a terminal authentication section authenticates the packet terminal and notifies an authentication result. For an authorized packet terminal, the terminal authentication section assigns an identifier for identifying a user LAN to the user LAN-name that has been notified from the packet terminal at the communication startup request, and notify the identifier to the packet terminal. The packet terminal transmits a packet containing an encrypted data with an attachment including a terminal address of a destination terminal as a destination address, a terminal address of the packet terminal as a source address, and the identifier. Then a packet decoding section decodes the encrypted data included in the packet, and if a tampering detection section detects tampering based on the decoded data, it discards the packet. A comparison section confirms whether a set of a user LAN name assigned with the identifier in the received packet and source address in the received packet is registered in a plurality of sets of user LAN-names and terminal addresses stored in the terminal information memory section. Based on a result of confirmation, a filtering section decides whether to transfer the packet to the destination address or to discard the packet. When the packet terminal has completed packet communication, the terminal authentication section releases the identifier allocated to the user LAN-name.

Accordingly, the present invention enables to identify any packet terminal by carrying out terminal authentication at the communication startup so as to prevent fraudulent access by an unknown terminal or an unauthorized terminal with a counterfeit terminal address. Also, because packet transfer is carried out under encryption, it is possible to prevent unauthorized terminal to pretend the identity of an authorized terminal, thereby preventing fraudulent access from the pretentious terminal. Moreover, because tampering detection and discarding of tampered packet are performed at the time of decoding the encrypted data, transfer of tampered packet is prevented so that interference for communication and increase in traffic congestion by tampered data are prevented.

Therefore, the problem of fraudulent access to a data network (user LAN) by counterfeited source address is resolved, and a packet transfer method is provided to enable only pre-registered terminals to communicate with certain data networks. Additionally, the problem of increase in packet transfer delay time, traffic congestion, load on the gateways is resolved, thereby providing an efficient packet transfer method to enable selecting an optimum routing path.

Also, checking of an identity of an identifier or a user LAN-name and the source address enables to prevent a terminal after it has been approved to access other data networks for which the terminal is not permitted to access, thereby preventing a terminal approved for connection to one data network to improperly access other data network. Also, by registering a plurality of identifiers or user LAN-names for one packet terminal, it is possible to access a plurality of data networks from one packet terminal, thereby improving service level to users.

BRIEF DESCRIPTION OF THE DRAWINGS

FIG. 5 is a schematic diagram to show the signal format in the packet in Embodiment 1.

DESCRIPTION OF THE PREFERRED EMBODIMENT

In the following, various embodiments of the present invention will be presented with reference to the drawings.

Although the present invention is applicable to both wireless and wired systems of any packet network, but the following presentation will be centered mostly on the wireless systems and an application to the wired system will be illustrated in the last embodiment.

Embodiment 1

Figure 1:
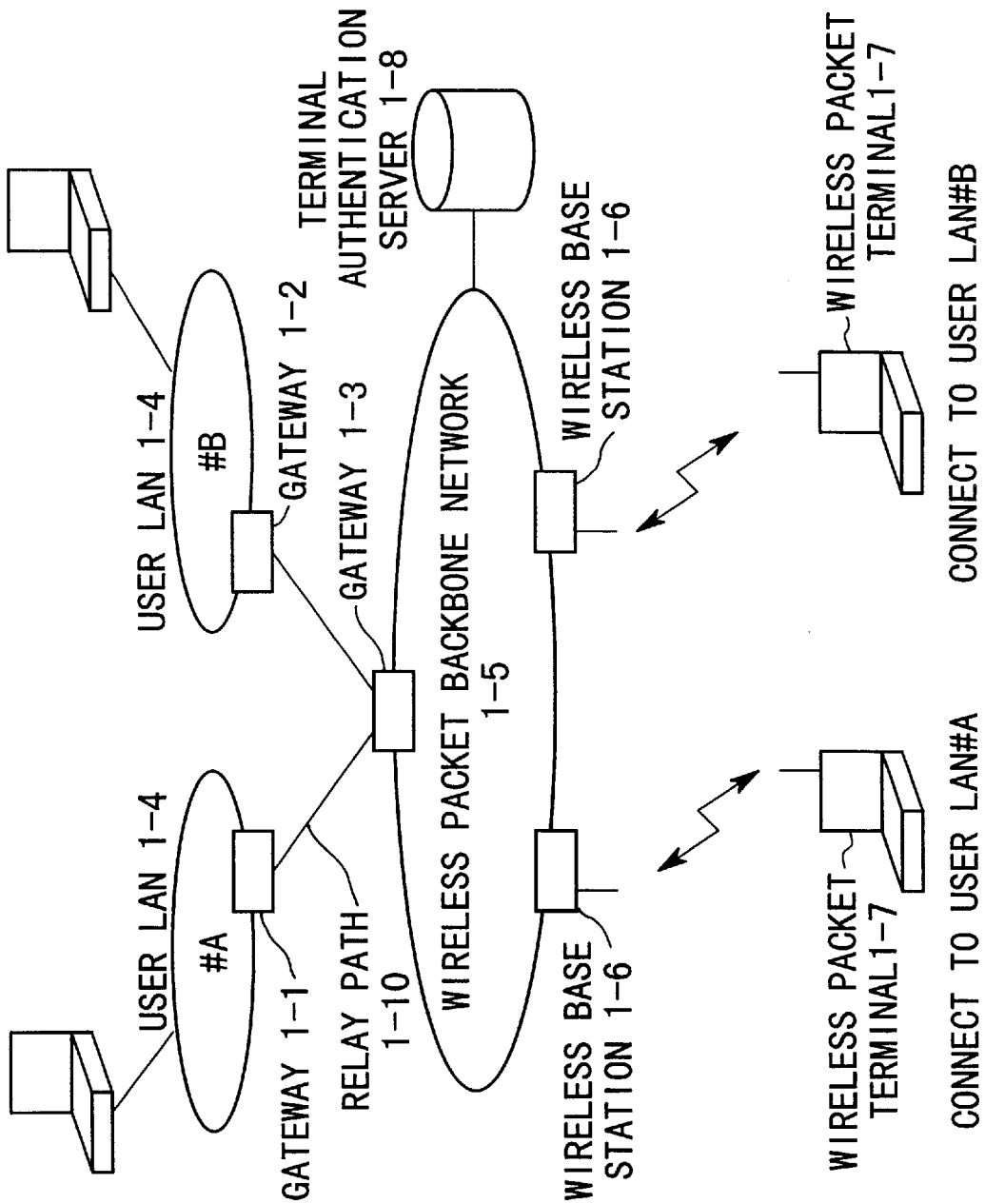
FIG. 1 is a block diagram of the configuration of a wireless packet communication network in Embodiment 1 of the present invention.

FIG. 1 shows a schematic configuration of the packet network according to the present embodiment. In the figure, a plurality of wireless base stations 1-6 and a wireless packet backbone network 1-5 connecting these wireless base stations 1-6 constitute a wireless packet network. Each of the wireless base stations 1-6 accommodates a plurality of wireless packet terminals 1-7. User LANs 1-4 are other packet networks, and the wireless packet backbone network 1-5 is connected to a plurality of user LANs 1-4 through gateways 1-1~1-3. Gateway 1-3 selects one LAN from the user LANs 14 according to VLAN-ID (will be explained later), and after deleting VLAN-ID from the packet, transfers the packet to a selected user LAN. The relay path 1-10 connecting the wireless packet backbone network 1-5 to user LAN 1-4 can be any of virtual channel connection (VCC) in asynchronous transfer mode (ATM), or virtual private network (VPN) in Internet. Further, wireless backbone network 1-5 is connected to a terminal authentication server 1-8, which stores a terminal information table and, when wireless packet terminal 1-7 is ready to start communication, provides terminal information to any wireless base station 1-6.

In this embodiment, terminal information table has a set of information comprised by at least terminal addresses, VLAN-IDs, and an encryption key specific to each terminal as necessary information for authenticating a terminal. Terminal address in this case uses media access control (MAC) address adopted in Ethernet. Also, each wireless packet terminal is pre-notified of its specific encryption key by the wireless packet network.

Figure 2:
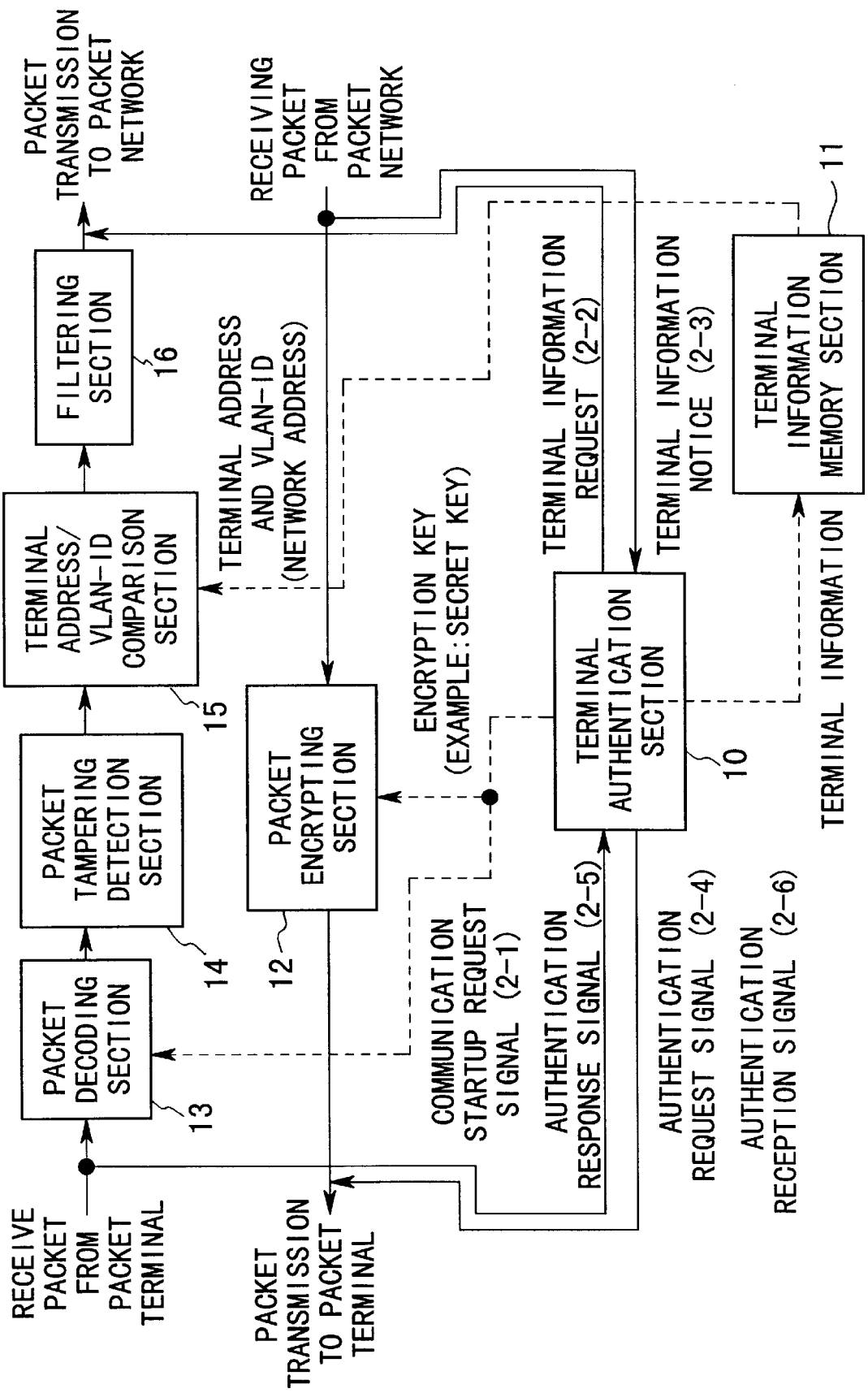
FIG. 2 is a block diagram of the configuration of the wireless base station used in each embodiment of the present invention.

FIG. 2 shows the configuration of the wireless base station 1-6 in this embodiment. Various devices provided in the wireless base station 1-6 will be explained as they appear in the presentation. It should be mentioned that solid lines in the drawing indicate packet signals exchanged between the base station 1-6 and the wireless packet backbone network 1-5 or wireless packet terminal 1-7, and broken lines indicate exchanges of control signals between the various sections within a wireless base station 1-6.

Figure 3:
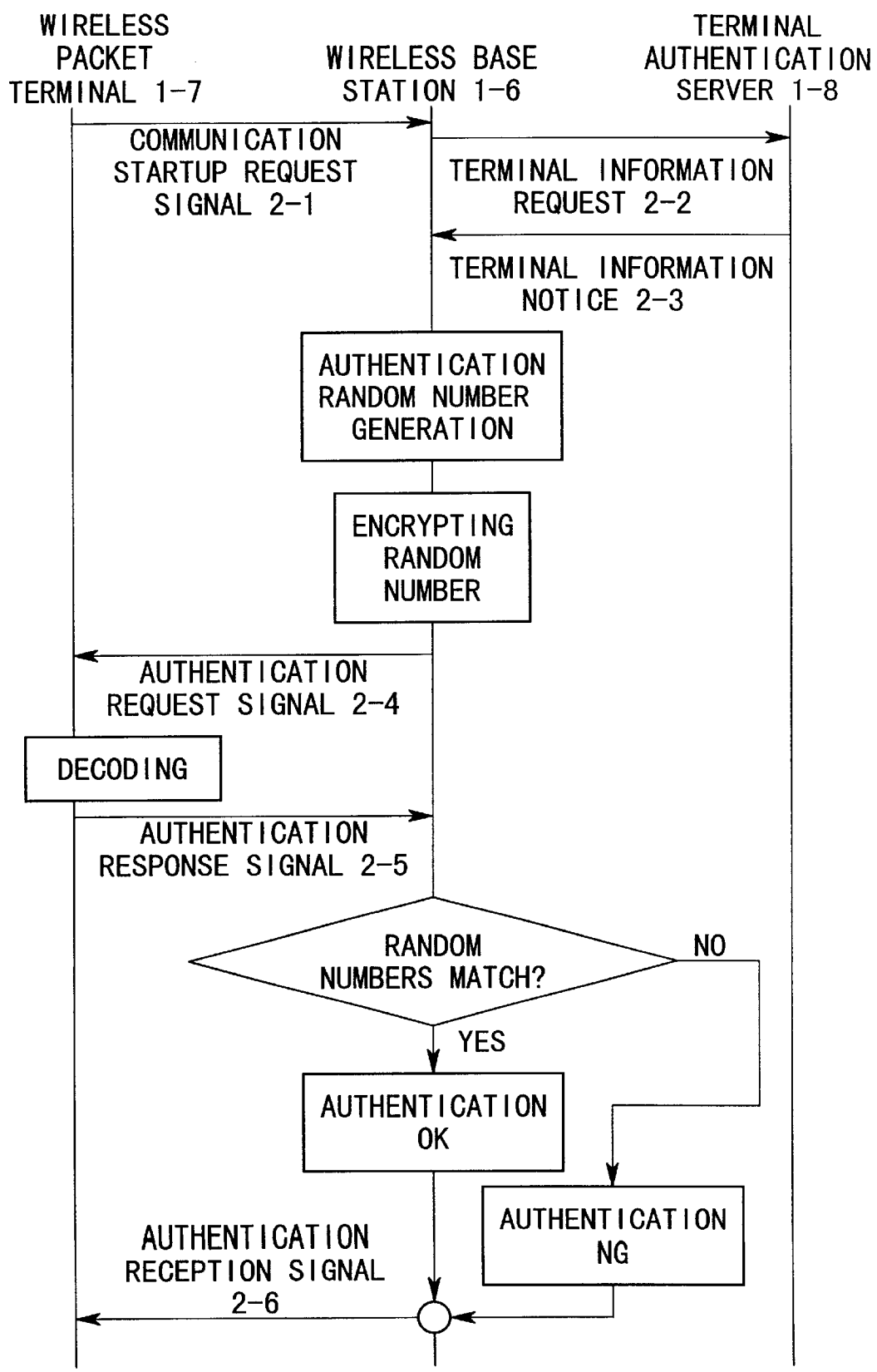
FIG. 3 is a flow diagram to show authentication steps used for wireless packet communication in Embodiment 1 of the present invention.

FIG. 3 shows the authentication steps used in this embodiment to authorize a wireless packet terminal 1-7. As shown in the figure, when starting communication, a wireless packet terminal 1-7 sends a communication startup request signal (2-1) to the wireless base station 1-6. The wireless base station 1-6 receives the communication startup request signal in the terminal authentication section 10, and sends a terminal information request (2-2) to the terminal authentication server 1-8. In response to the terminal information request, terminal authentication server 1-8 forwards terminal information notice to the wireless base station 1-6. Upon receiving the terminal information notice (2-3), terminal authentication section 10 stores the received terminal information in the terminal information memory section 11. Next, terminal authentication section 10 generates a random number for the purpose of terminal authentication and prepares an encryption of the random number using the encryption key provided in the terminal information, and the encrypted random number is sent, as the authentication request signal (2-4) to wireless packet terminal 1-7. Wireless packet terminal 1-7 decodes the encrypted random number received from the wireless base station 1-6 using the encryption key which had been pre-notified by the wireless packet network, and sends the result back to the wireless base station 1-6 as the authentication response signal (2-5). Wireless base station 1-6 compares returned random number with the random number, previously sent as the authentication request signal from the terminal authentication section 10. When the two random numbers match, terminal authentication section 10 decides that wireless packet terminal 1-7 is an authorized terminal, and so notifies the wireless packet terminal 1-7, using the authentication reception signal (2-6), that the communication is allowed. From this point on, the packet encrypting section 12 encrypts only the data section of the data packet (except the header section), using the encryption key received from terminal authentication section 10, and transmits the encrypted data. On the other hand, if the two random numbers do not match, terminal authentication section 10 decides that the wireless packet terminal 1-7 is an unauthorized terminal, and, using the authentication reception signal, informs to the wireless packet terminal 1-7 that the communication request is denied (2-6).

Figure 4:
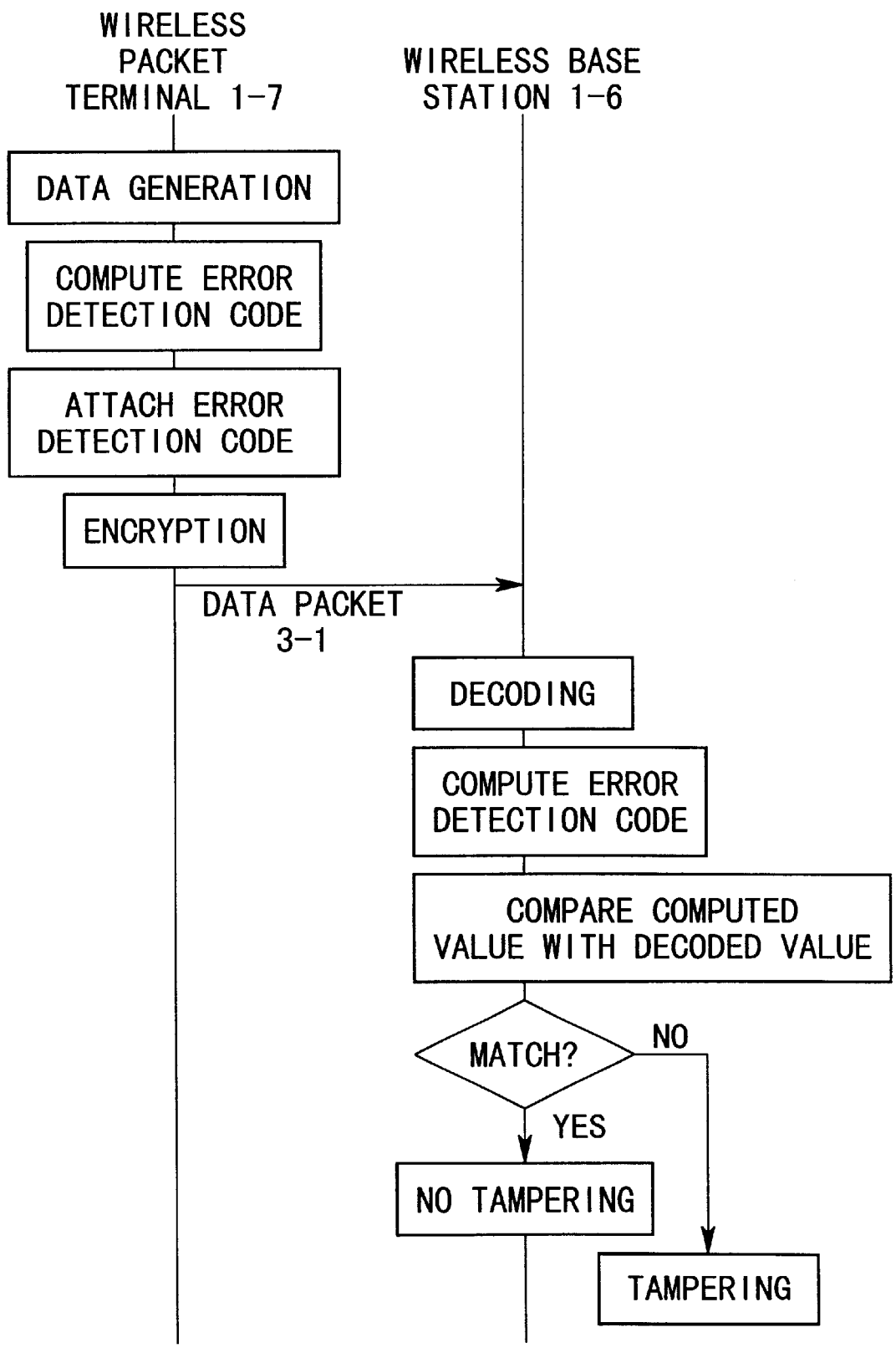
FIG. 4 is a flow diagram to show the steps for tampering detection of data packet in Embodiment 1.

FIG. 4 shows tampering detection steps for the data packet according to the present embodiment. Wireless packet terminal 1-7 calculates an error detection code for generated data and attaches it to the generated data and encrypts the total data, and attaches header information and sends the entire data packet to the wireless base station 1-6 (3-1). Packet decoding section 13 in the wireless base station 1-6 decodes encrypted data in the data section of the data packet and forwards it to packet tampering detection section 14. Packet tampering detection section 14 computes error detection code of the decoded data, and compares calculated error detection code with the error detection code obtained by decoding the data packet, and when the two error codes match, it decides that there is no tampering and if the two do not match, it decides that there is tampering.

Table 1 shows terminal information table according to the present embodiment, which is comprised by terminal addresses, VLAN-IDs, and terminal information including encryption keys necessary for terminal authentication. Here, terminal authentication section 10 commands terminal information memory section 11 to store terminal information (refer to FIG. 2).

TABLE 1

Terminal Information Table

| Terminal Address | VLAN-ID | Encryption Key |
| --- | --- | --- |
| Address #1 | VLAN-ID #A | Encryption Key #a |
| Address #2 | VLAN-ID #A | Encryption Key #b |
| Address #3 | VLAN-ID #B | Encryption Key #c |

VLAN-ID is defined as an identifier for identifying user LANs 1-4, and each user LAN is assigned a specific value. Wireless packet terminal 1-7 pre-registers an assigned VLAN-ID in the terminal authentication server 1-8 for the access-approved user LAN 1-4.

FIG. 5 shows a packet signal format used by the wireless packet network according to the present embodiment. As shown in this illustration, the packet has a destination address 4-1, a source address 4-2 and a VLAN-ID 4-3 in the header information, and encrypted user data 4-4.

As will be described in detail in the following, although wireless base station 1-6 receives various packets from each wireless packet terminal 1-7, it transfers only those packets whose VLAN-IDs 4-3 match the VLAN-ID assigned to corresponding a user LAN 1-4, and discards those which do not match with the assigned VLAN-ID.

Figure 6:
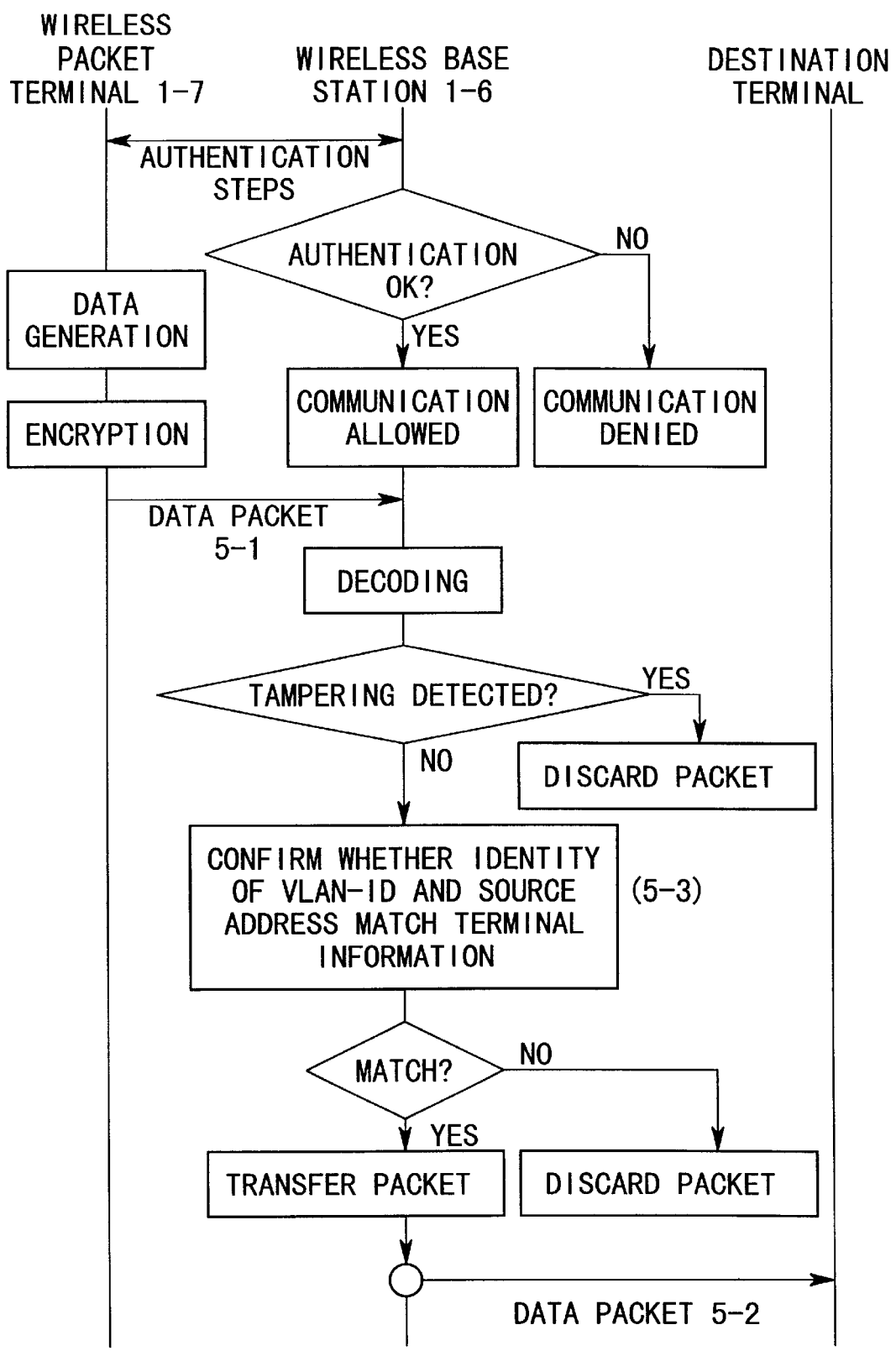
FIG. 6 is a flow diagram to show the packet transfer steps in Embodiment 1.

FIG. 6 shows packet transfer steps used in this embodiment. At communication startup, wireless base station 1-6 performs authentication process shown in FIG. 3, and when the wireless packet terminal 1-7 is recognized as an authorized terminal, it is allowed to begin a communication process. Next, base station 1-6 performs tampering detection step shown in FIG. 4, and if it detects tampering in the data packet (5-1) received from wireless packet terminal 1-7, this data packet is discarded. If tampering is not detected, terminal address/VLAN-ID comparison section 15 in the wireless base station 1-6 refers to the terminal information stored in the terminal information memory section 11 to confirm the identity of the VLAN-ID and the source address 4-2, and the result is sent to filtering section 16. Specifically, the terminal address/VLAN-ID comparison section 15 searches in the terminal information table shown in Table 1, and if there is a set of a terminal address and a VLAN-ID in the table to match the source address 4-2 and VLAN-ID 4-3 in the data packet, the identity is considered to match the terminal information. Filtering section 16 examines the comparison result received, and if the identity matches the terminal information, data packet is sent to the destination terminal specified in the destination address 4-1 (5-2). If the destination terminal is connected to the user LAN 1-4, the data packet is transmitted from gateway 1-3 to user LAN 1-4 though gateway 1-1 or gateway 1-2. If the destination terminal is connected to the wireless packet network, the data packet is sent to the destination terminal without going through the gateway. On the other hand, if the VLAN-ID and the source address 4-2 in the received packet do not match the content in the terminal information, filtering section 16 discards the data packet.

At this point, transfer steps for packet from user LAN 1-4 to wireless packet terminal 1-7 will be explained briefly. When a packet is transmitted to gateway 1-1 or gateway 1-2 to which the user LAN 1-4 is connected, the gateway receiving the packet transfers the packet from relay path 1-10 to gateway 1-3. In response to packet transmission from the relay path 1-10, gateway 1-3 attaches VLAN-ID assigned to source user LAN 1-4 to the packet and transfers the packet to the wireless packet backbone network 1-5. Wireless base station 1-6 receives the transfer packet, and after encrypting the data section of the packet, forwards the encrypted data packet to the wireless packet terminal 1-7 specified by the destination address, which receives and decodes the encrypted packet.

According to this embodiment, because terminal authentication is carried out at the start of communication, a packet terminal attempting a connection can be identified so that an unknown terminal or fraudulent access from a terminal with counterfeit terminal addresses can be prevented. Also, because a dedicated encryption key for each terminal is used to encrypt and transfer the packet, it enables to prevent unauthorized packet terminal to pretend the identity of an authorized terminal, thereby preventing fraudulent access from the pretentious terminal. Furthermore, because tampering detection is performed at the time of decoding of encryption, improper packet can be discarded, it enables to prevent transmission of tampered packet, thereby preventing interference from tampered data and increase in traffic congestion in the wireless packet network. Furthermore, because a confirmation of an identity of VLAN-ID and a source address is preformed, once a terminal is authenticated, it is prevented from accessing other user LANs to which the authenticated terminal does not belong, thereby preventing fraudulent access from terminals of other user LANs.

Embodiment 2

In this embodiment, the configurations of the packet network and wireless base station, authentication steps of wireless packet terminals, tampering detection steps for data packet and packet signal format are the same as those shown in FIGS. 1~5 in Embodiment 1.

Similar to Embodiment 1, each user LAN 1-4 is assigned a specific VLAN-ID.

Each wireless packet terminal 1-7 pre-registers a plurality of VLAN-IDs corresponding to approved user LANs 1-4 in the terminal authentication server 1-8.

Table 2 shows a terminal information table in this embodiment. For example, a wireless packet terminal having an address #1 as its terminal address is allowed to connect to user LAN 1-4 having VLAN-ID #A or VLAN-ID #B as VLAN-ID information.

TABLE 2

Terminal Information Table

| Terminal Address | VLAN-ID | VLAN-ID | Encryption Key |
| --- | --- | --- | --- |
| Address #1 | VLAN-ID #A | VLAN-ID #B | Encryption Key #a |
| Address #2 | VLAN-ID #A | VLAN-ID #B | Encryption Key #b |
| Address #3 | VLAN-ID #B | — | Encryption Key #c |

As will be described in detail below, although wireless base station 1-6 receives various packets from each wireless packet terminal 1-7, it transfers only those packets whose VLAN-ID 4-3 matches one of the VLAN-IDs of user LANs to which the wireless packet terminal are permitted to connect, and discards those which do not match with any of the registered VLAN-IDs.

Figure 7:
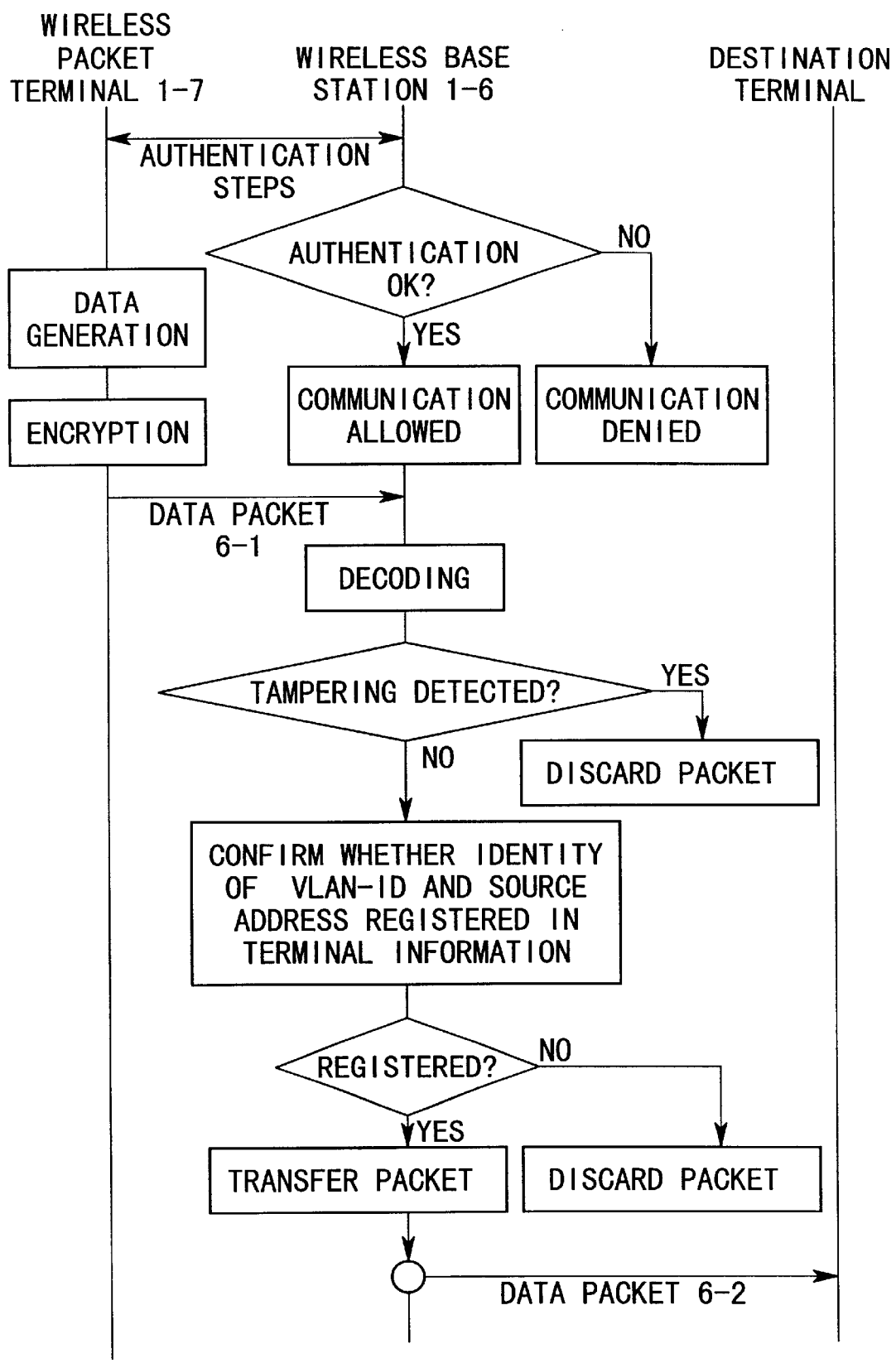
FIG. 7 is a flow diagram to show the packet transfer steps in Embodiment 2 of the present invention.

FIG. 7 shows packet transfer steps used in this embodiment. In the wireless base station 1-6, terminal authentication section 10 performs authentication of a wireless packet terminal 1-7, and when the wireless packet terminal 1-7 is recognized as an authorized packet terminal, it is allowed to begin an encrypted communication process. Next, in the wireless base station 1-6, packet decoding section 13 decodes data packet (6-1) received from wireless packet terminal 1-7, and packet tampering detection section 14 performs tampering detection on the received data packet, and if it detects tampering, the data packet is discarded. The processing steps to this point are the same as those in Embodiment 1. On the other hand, if tampering is not detected, the terminal address/VLAN-ID comparison section 15 of the wireless base station 1-6 refers to the terminal information stored in the terminal information memory section 11 to check if the identity of the VLAN-ID 4-3 and the source address 4-2 is registered in the terminal information, and the result is sent to filtering section 16. More specifically, the terminal address/VLAN-ID comparison section 15 bases its decision on whether there is a match between the terminal address in its terminal information table and the source address 4-2, as well as on whether there is a match to the current VLAN-ID 4-3 in the registered VLAN-IDs for the terminal address in the information table. Based on the identity confirmation result, filtering section 16 transfers data packet (6-2) to a destination terminal having the address specified as the destination address 4-1, when the identity is registered in the terminal information. If, at this time, the destination terminal is connected to user LAN 1-4, the data packet is transmitted from gateway 1-3 to user LAN 1-4 through gateway 1-1 or 1-2. If the destination terminal is connected to the wireless packet network, the data packet is transmitted to the destination terminal without going through the gateway. On the other hand, if the identity of the VLAN-ID and the source address is not registered in the terminal information, filtering section 16 discards this data packet.

Accordingly, this embodiment provides additional benefits to those in Embodiment 1. That is, because it is necessary to confirm the identity of VLAN-ID and the source address, it is possible to prevent a terminal, after it has been authenticated, to access unapproved data network, thereby preventing a terminal approved for connection to one data network to improperly access other data network. Also, because one wireless packet terminal can register a plurality of VLAN-IDs, it is possible to access a plurality of data networks through one wireless packet terminal, thereby improving the quality of user service.

Embodiment 3

Figure 8:
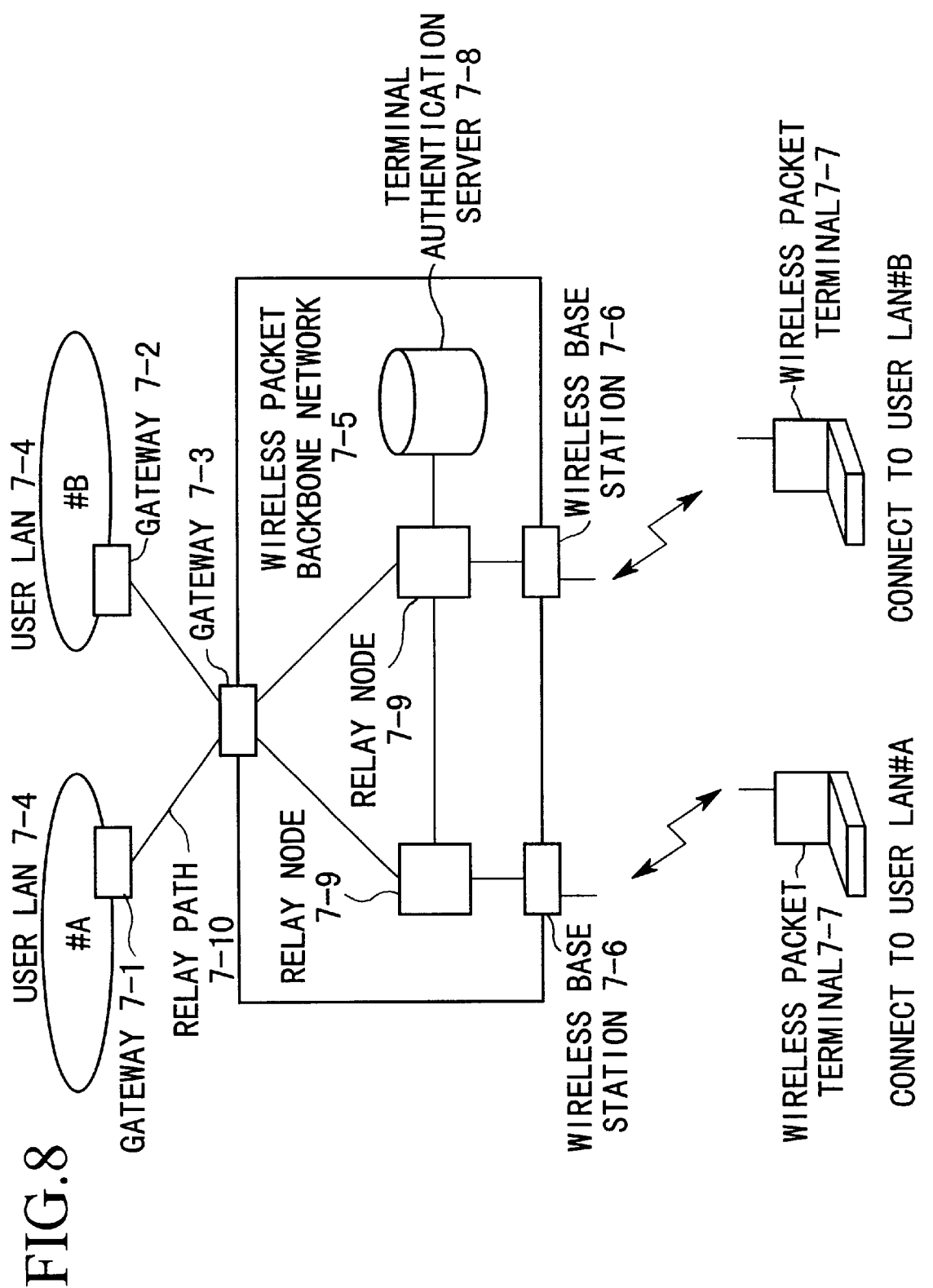
FIG. 8 is a block diagram of the configuration of the wireless packet communication network in Embodiment 3 of the present invention.

FIG. 8 is a schematic drawing of the configuration of a packet network of this embodiment. As in Embodiment 1, the wireless packet network is comprised by a plurality of wireless base stations 7-6 and a wireless packet backbone network 7-5 connecting the plurality of wireless base stations 7-6. Each wireless base station 7-6 accommodates a plurality of wireless packet terminals 7-7. Wireless packet backbone network 7-5 is connected to a plurality of user LANs 7-4 (other packet networks) through gateways 7-1~7-3. Gateway 7-3 selects a user LAN 7-4, according to VLAN-ID 4-3, and, after deleting VLAN-ID from the packet, transfers the packet to the selected user LAN. Further, wireless packet backbone network 7-5 in this embodiment has a plurality of relay nodes 7-9 for switching the packets. Each relay node 7-9 has routing information based on destination address 4-1 and VLAN-ID 4-3, and transfers the packet using optimal paths based on the routing information. For example, upon receiving a packet, relay node 7-9 correlates and memorizes the information from the received packet, i.e., the terminal address shown by the source address 4-2 and the port which received the packet, and VLAN-ID 4-3 and the port which received the packet. Next, if the received packet is a unicast packet, relay node 7-9 sends the received packet to the port corresponding to the terminal address indicated by the destination address 4-1. On the other hand, if the received packet is a broadcast packet or a multicast packet, the relay node 7-9 sends the packet to all the ports corresponding to the VLAN-IDs 4-3. In this case, the port refers to an interface for connecting communication paths between the relay node 7-9 and its neighboring relay nodes or its neighboring wireless base stations. Also, relay path 7-10 may be selected from a number of options as in the case of relay path 1-10 presented in FIG. 1. Also, wireless backbone packet network 7-5 is connected to terminal authentication server 7-8 through a relay node 7-9. Terminal authentication server 7-8 is similar to the terminal authentication server 1-8 shown in FIG. 1, and is provided with terminal information table shown in Table 2, and provides terminal information to the wireless base station 7-6 when the wireless packet terminal 7-7 starts communication.

In this embodiment, an encryption key registered in the terminal information table is used for terminal authentication and for encrypting unicast packet, and this encryption key is referred to as "terminal-key" in the following presentation. Also, wireless packet network pre-notifies each wireless packet terminal 7-7 of its dedicated terminal-key.

In addition to above, terminal authentication server 7-8 is provided with VLAN information shown in Table 3 as a table.

TABLE 3

VLAN Information Table

| VLAN-ID | VLAN-key |
|---------|----------|
| VLAN-ID #A | VLAN-key #a |
| VLAN-ID #B | VLAN-key #b |

VLAN information table has a record of VLAN-IDs and an encryption keys shared by all the terminals having the same VLAN-ID. The encryption key is referred to as VLAN-key henceforth. VLAN-key is used for encrypting broadcast and multicast packets. Here, wireless packet network notifies each wireless packet terminal 7-7 of its dedicated VLAN-key.

As in Embodiment 1, a specific value of VLAN-ID is assigned to each user LAN 7-4.

Each wireless packet terminal 7-7 subscribing to the user LAN 7-4 pre-registers its dedicated VLAN-ID in a terminal information table in the terminal authentication server 7-8.

As described in detail below, although wireless base station 7-6 receives various packets from each wireless packet terminal 7-7, it transfers only those packets whose VLAN-IDs 4-3 match one of the VLAN-IDs of the user LANs 7-4 to which the wireless packet terminal is permitted to connect, and discards those packets which do not match with any of the VLAN-ID.

In this embodiment, the configuration of the wireless base station, authentication steps for the wireless packet terminals, detection steps for data packet tampering and packet signal format are the same as those shown in FIGS. 2~5 in Embodiment 1.

Figure 9:
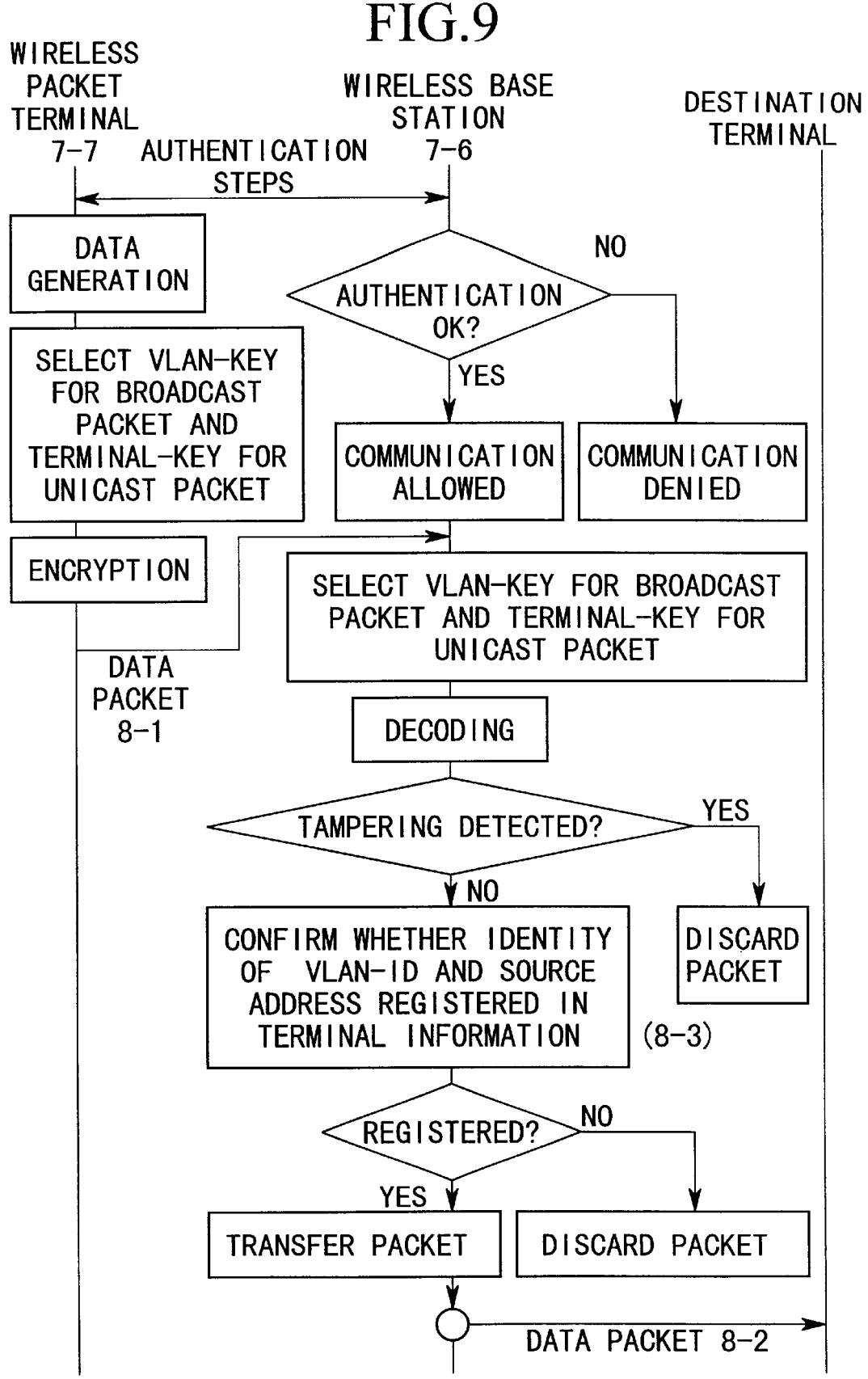
FIG. 9 is a flow diagram to show the steps for packet transfer in Embodiment 3.

FIG. 9 shows flow steps of packet transfer used in this embodiment. As in Embodiment 1, in the wireless base station 7-6, terminal authentication section 10 performs authentication of the wireless packet terminal 7-7 at startup of communication. If the wireless packet terminal is an authorized packet terminal, encrypted communication is started. Also, at the time of authentication step, terminal authentication section 10 obtains terminal information and VLAN information from the terminal authentication server 7-8, and stores the information in terminal information memory section 11. On the other hand, for sending a unicast packet, wireless packet terminal 7-7 selects terminal-key for encryption, and sends the encrypted data packet (8-1) to the wireless base station 7-6. When sending a broadcast or multicast packet, the wireless packet terminal 7-7 selects VLAN-key for encryption, and sends encrypted data packet (8-1) to the wireless base station 7-6. In response to such key selection, if a unicast packet is received, packet decoding section 13 in the wireless base station 7-6 decodes the data packet received using the terminal-key, and if a broadcast or multicast packet is received, packet decoding section 13 decodes the data packet using the VLAN-key. Packet tampering detection section 14 examines whether the decoded data packet has been tampered by following the steps shown in FIG. 4, and if there is tampering, the data packet is discarded. On the other hand, if tampering is not detected, terminal address/VLAN-ID comparison section 15 confirms identity of VLAN-ID 4-3 and source address 4-2, as in Embodiment 2, and if the identity is registered in the terminal information, sends the data packet (8-2) to the destination terminal specified by the destination address. At this time, in this embodiment, when the destination terminal is connected to the user LAN 74, each relay node 7-9 selects a next transmission port depending on the destination addresses 4-1 in the data packet, and sends the data packet to gateway 7-3. Gateway 7-3 selects gateway 7-1 or 7-2, depending on VLAN-ID 4-3, and transfers the data packet to user LAN 7-4. When the destination terminal is connected to the wireless packet network, each relay node 7-9 selects a next transmission port, depending on the destination address 4-1, and sends the data packet to the destination terminal. Therefore, the data packet is transmitted without going through the gateway. On the other hand, if the identity of VLAN-ID and source address is not registered in the terminal information, filtering section 16 discards the data packet.

Figure 10:
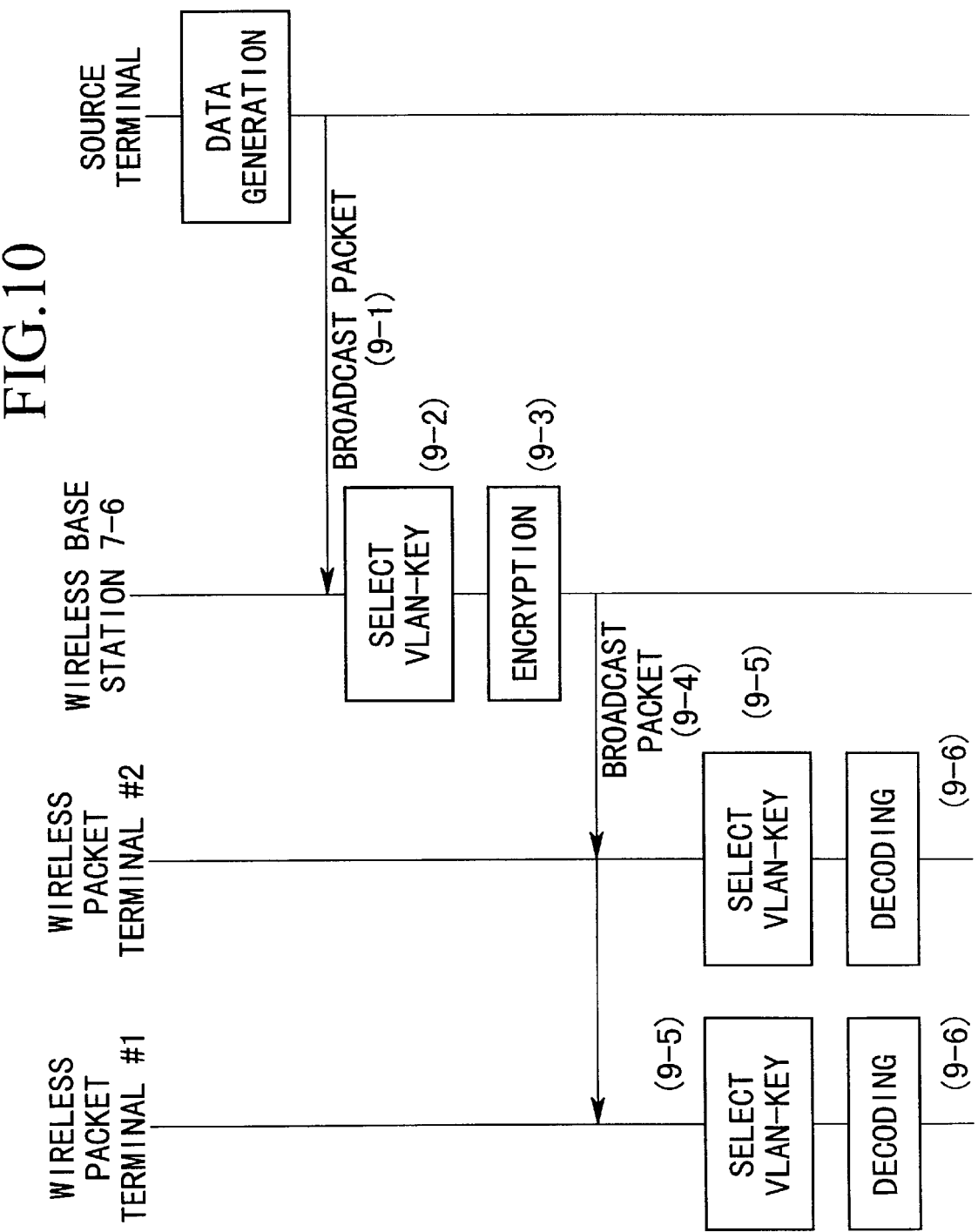
FIG. 10 is a flow diagram to show the transfer steps for broadcast packet in Embodiment 3.

FIG. 10 shows broadcast packet transfer steps used in this embodiment. When transfer data are generated at the source terminal, a broadcast packet is sent to the wireless base station 7-6 (9-1). Packet encrypting section 12 in the wireless base station 7-6 selects a VLAN-key from a group of encryption keys received from the terminal authentication section 10 (9-2), and encrypts the broadcast packet (9-3), and sends the encrypted broadcast packet to all the packet terminals (9-4), (in this case, wireless packet terminals #1, #2 in the drawing). The wireless packet terminals #1, #2 select VLAN-key as an encryption key (9-5) and decodes the encrypted broadcast packet (9-6). Because this embodiment uses VLAN-key for encryption, all the packet terminals having the same VLAN-ID can decode broadcast or multicast packets.

Figure 11:
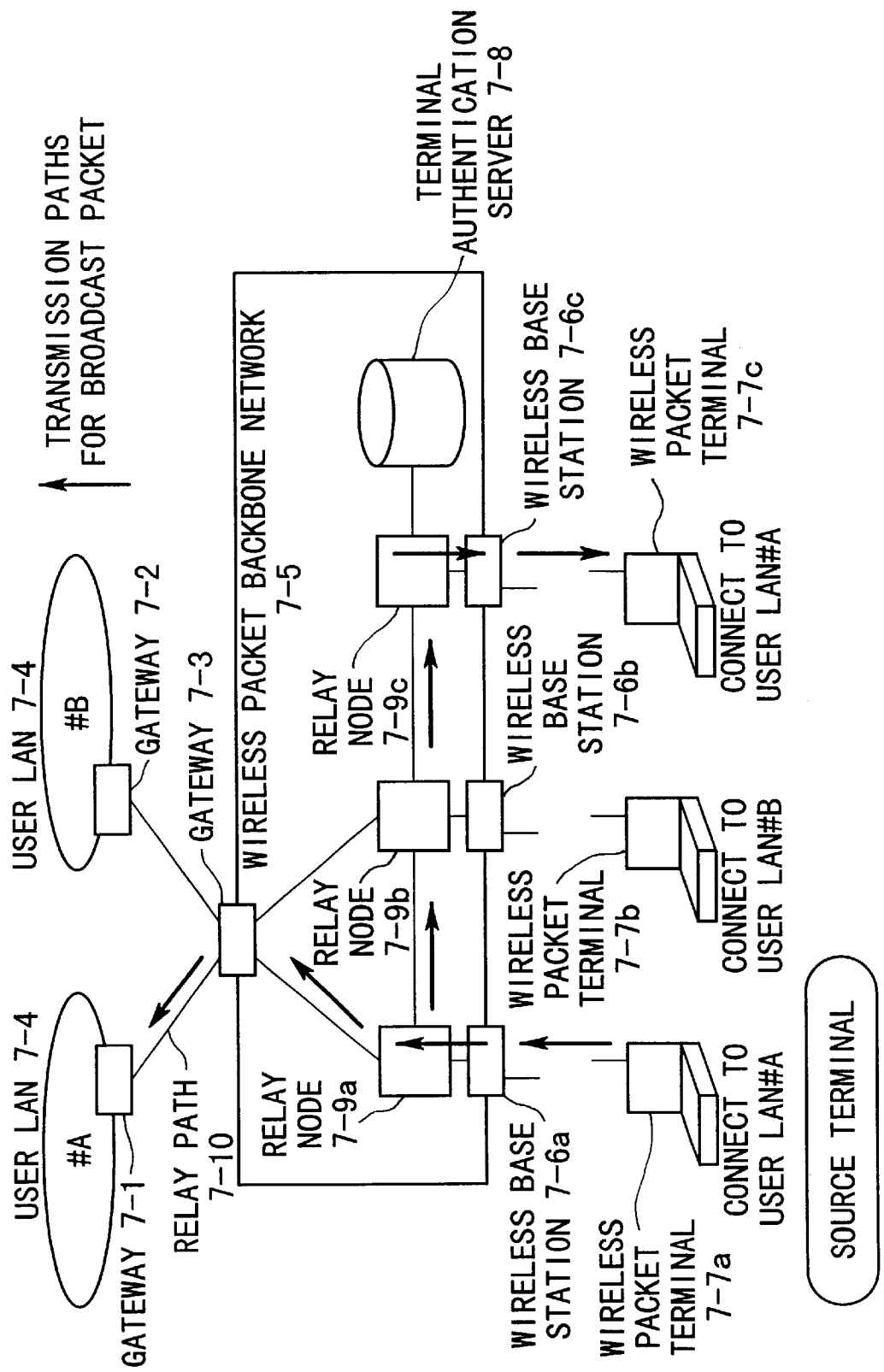
FIG. 11 is an illustration of the routing of broadcast packet transfer in Embodiment 3.

FIG. 11 illustrates the transfer steps of broadcast packets inside the network. As shown in this illustration, a broadcast packet is sent from a wireless packet terminal 7-7a of the user LAN#A (sending terminal) to wireless base station 7-6a and is forwarded to wireless packet backbone network 7-5. Wireless packet backbone network 7-5 transfers broadcast packet from the relay node 7-9a to gateway 7-3 and to relay node 7-9b, according to VIAN-ID 4-3. Gateway 7-3 examines VLAN-ID 4-3, and transfers the broadcast packet to gateway 7-1 connected to user LAN#A. In the meantime, relay node 7-9b transfers the broadcast packet further onto relay node 7-9c which transfers the broadcast packet to wireless base station 7-6c which is connected to a wireless packet terminal 7-7c subscribing to user LAN#A.

Accordingly, transmission routing for broadcast packet is selected based on VLAN-ID as routing information. Also, wireless base station 7-6b is connected only to wireless packet terminal 7-7b which subscribes to user LAN #B, and does not accommodate any wireless packet terminals having the same VLAN-ID as VLAN-ID 4-3. Therefore, relay node 7-9b does not transfer broadcast packets to wireless base station 7-6b.

It should be noted that, although the above description of the packet transfer steps was based on Embodiment 2, the steps may also be based on those in Embodiment 1. In such a case, terminal information table will be Table 1 instead of Table 2, and also instead of checking whether the identity of VLAN-ID and source address is registered (step 8-3 in FIG. 9), it is necessary to check whether the identity matches the terminal information (step 5-3 in FIG. 6).

Accordingly, this embodiment provides the following benefits in addition to those in Embodiments 1~2. Because this method of packet transfer is based on selecting a next relay node according to the destination address, it enables to select optimal packet transfer routing from one packet terminal to another packet terminal without going through gateways, thereby preventing an increase in transfer delay time.

Also, when transferring broadcast or multicast packets, because the selection of a next relay node is based on VLAN-ID, it is not necessary to unicast from the gateway to all the communicating wireless packet terminals using the same VLAN-ID. Therefore, it is possible to select optimal routing for the packet transmission, thereby preventing transfer time delay, traffic congestion and increase in the gateway-processing load.

Also, because encrypting is based on the same encryption key for terminals of the same VLAN-ID, it is possible for a wireless base station to send a packet, in one broadcast or multicast, to all the wireless packet terminals using the same VLAN-ID. Therefore, compared with the case of transferring a plurality of encrypted packets to a plurality of wireless packet terminals using different encryption keys for each terminal, traffic congestion, transfer time delay and load on the base station can be decreased. Further, although a VLAN-key is not specific to a terminal, it is not possible to find out other packet terminals having different VLAN-Ids. Therefore, fraudulent access by pretentious packet terminal will be impossible.

Embodiment 4

The configuration of the packet network in this embodiment is the same as that shown in FIG. 8 in Embodiment 3. The configurations of the wireless base station, authentication steps of wireless packet terminals, tampering detection steps for data packet and packet signal format are the same as those shown in FIGS. 2~5 in Embodiment 1.

As in Embodiment 3, each user LAN 7~4 has been assigned a specific VLAN-ID.

Wireless packet terminal 7-7 subscribing to user LANs 7-4 pre-registers dedicated VLAN-IDs in the terminal information table stored in the terminal authentication server 7-8.

As in Embodiment 3, although wireless base station 7-6 receives various packets from each wireless packet terminal 7-7, it transfers only those packets whose VLAN-IDs 4-3 match one of the VLAN-IDs of the user LANs 7-4 to which the wireless packet terminal is allowed to connect, and discards those which do not match with any of the registered VLAN-IDs.

Also, terminal authentication server 7-8 has the same VLAN information table as the one shown in Table 3 in Embodiment 3, and VLAN-key is used for encoding broadcast and multicast packets. As in Embodiment 3, wireless packet network pre-notifies each wireless packet terminal 7-7 of a VLAN-key.

Terminal information table in this embodiment is the same as Table 2 in Embodiment 2. Encryption key (terminal-key) registered in the terminal information table is used for the terminal authentication process, for encrypting unicast packet and for encrypting broadcast and multicast packets by wireless packet terminals. Also, wireless packet network pre-notifies each wireless packet terminal 7-7 of a terminal-key.

Figure 12:
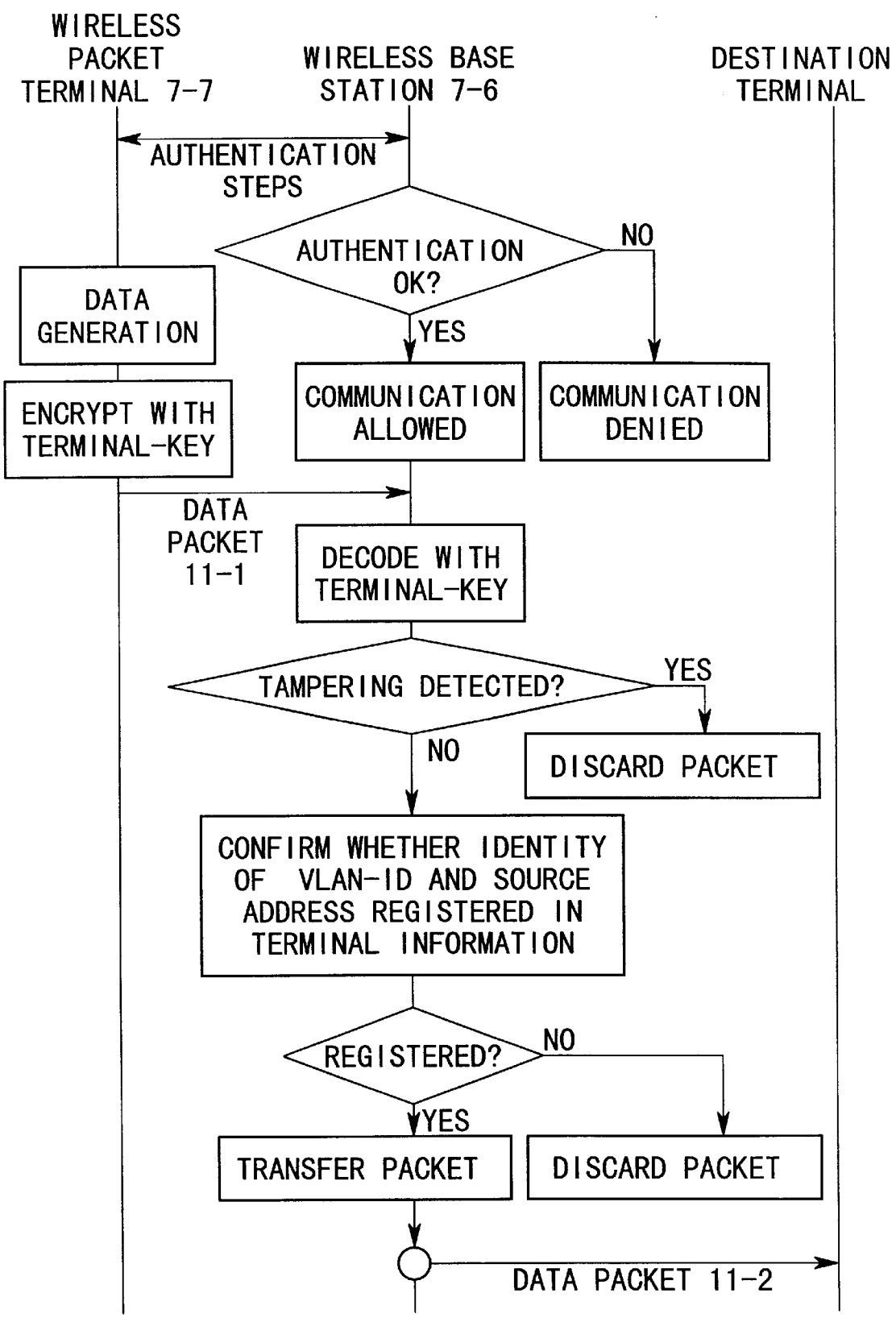
FIG. 12 is a flow diagram to show the packet transfer steps in Embodiment 4 of the present invention.

FIG. 12 shows packet transfer steps used in this embodiment. As in Embodiment 3, terminal authentication section 10 in the wireless base station 7-6 authenticates a wireless packet terminal 7-7 at the startup of communication, and if it is an authorized terminal, encrypted communication is started. Also, as in Embodiment 3, terminal authentication section 10 obtains terminal information and VLAN information from the terminal authentication server 7-8 in the authentication steps. Next, steps are now different than those in Embodiment 3, and wireless packet terminal 7-7 does not distinguish unicast/broadcast/multicast packets, and encrypts the data packet using the terminal-key, and the encrypted data packet is sent to wireless base station 7-6 (11-1). Packet decoding section 13 in the wireless base station 7-6 decodes the encrypted data packet using the terminal-key without distinguishing unicast/broadcast/multicast packets. Subsequent steps are the same as those in Embodiment 3. Wireless base station 7-6 discards the data packet received if it has been tampered, and if the received data packet has not been tampered and the identity of VLAN-ID and source address is registered in the terminal information, it is sent to the destination terminal specified in the destination address 4-1 (11-2). At this time, the data packet is transferred in the same manner as in Embodiment 3. On the other hand, if the identity of VLAN-ID and source address is not registered in the terminal information, filtering section 16 discards the data packet.

In this embodiment, because broadcast and multicast packets transmitted from wireless base station 7-6 are encrypted using a VLAN-key as in Embodiment 3, those packet terminals having the same VLAN-ID can decode broadcast and multicast packets. On the other hand, broadcast and multicast packets transmitted from wireless packet terminals 7-7 are encrypted using terminal-key, therefore, wireless base station 7-6 need not decode the encrypted packets by switching between two types of encryption key (terminal-key and VLAN-key) as is the case in Embodiment 3.

Also, the manner of broadcast packet transfer in the packet network in this embodiment is the same as that shown in FIGS. 10~11 in Embodiment 3. That is, when wireless base station 7-6 is sending broadcast or multicast packet, VLAN-key is used for encryption.

Also, the above method of packet transfer was based on Embodiment 2, but it may be based on Embodiment 1. In such a case, as explained in Embodiment 3, terminal information table shown in Table 1 is used and it is necessary to confirm matching of the identity of VLAN-ID and source address with the terminal information.

Accordingly, in this embodiment, as in Embodiment 3, packet transfer from one wireless packet terminal to another wireless packet terminal can be performed by selecting an optimal routing without going through gateways, thereby preventing an increase in transfer delay time.

Additionally, this embodiment enables for a wireless base station to perform broadcast or multicast packet transfer using the same encryption key common to respective VLAN-ID. Therefore, it is possible for a wireless base station to send a packet, in one broadcast or multicast, to all the wireless packet terminals using the same VLAN-ID. Therefore, compared with the case of transmitting a plurality of packets to a plurality of wireless packet terminals using different encryption keys for each terminal, traffic congestion, transfer time delay and load on the base station can be decreased.

Also, when a wireless base station is performing broadcasting or multicasting packet transfer, encryption is performed using the encryption key for unicast packet transfer. Therefore, when a wireless base station receives a packet from a wireless packet terminal, decoding can be performed without switching the encryption key, and compared with the case of packet transfer using encryption keys for broadcast or multicast packet transfer, load on the wireless base station can be controlled.

Embodiment 5

The configuration of the packet network in this embodiment is the same as that shown in FIG. 8 in Embodiment 3. The configurations of the wireless base station, authentication steps of wireless packet terminals, tampering detection steps for data packet and packet signal format are the same as those shown in FIGS. 2~5 in Embodiment 1.

As in Embodiment 3, each user LAN 7-4 has been assigned a specific VLAN-ID.

Terminal authentication server 7-8 has a terminal information table and VLAN information table, as in Embodiment 3.

As in Embodiment 3, although wireless base station 7-6 receives various packets from each wireless packet terminal 7-7, it transfers only those packets whose VLAN-IDs 4-3 match one of the VLAN-IDs of the user LANs 7-4 to which the wireless packet terminal is allowed to connect, and discards those which do not match with any of the registered VLAN-IDs.

In this embodiment, encryption is performed using a VLAN-key. Wireless packet network pre-notifies each wireless packet terminal 7-7 of a VLAN-key.

Terminal information table in this embodiment is the same as that shown in Table 2 in Embodiment 2. In this case, encryption key registered in the terminal information table is the VLAN-key of the user LAN 7-4 to which each packet terminal belongs.

Figure 13:
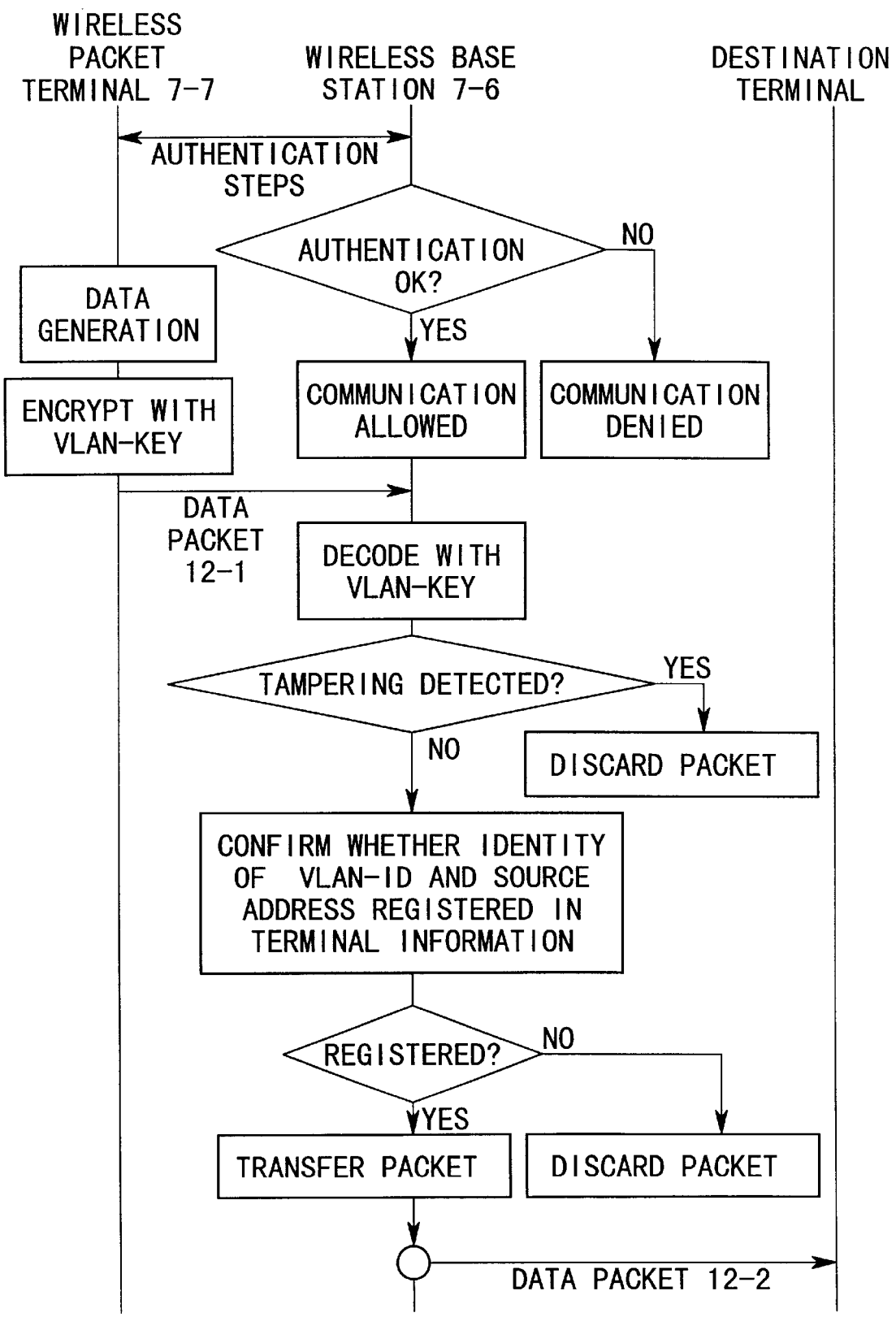
FIG. 13 is a flow diagram to show the packet transfer steps in Embodiment 5 of the present invention.

FIG. 13 shows packet transfer steps used in this embodiment. As in Embodiment 3, terminal authentication section 10 in the wireless base station 7-6 performs authentication of a wireless packet terminal 7-7 at the time of starting communication, and if it is an authorized terminal, encrypted communication is started. Also, as in Embodiment 3, terminal authentication section 10 obtains terminal information and VLAN information from the terminal authentication server 7-8. Next, departing from the steps in Embodiment 3 or 4, wireless packet terminal 7-7 encrypts the data packet using the VLAN-key without discriminating unicast/broadcast/multicast packets, and the encrypted packet is sent to wireless base station 7-6 (12-1). Packet decoding section 13 in the wireless base station 7-6 decodes the encrypted packet using the VLAN-key without discriminating unicast/broadcast or multicast packets. Subsequent steps are the same as those in Embodiment 3. Wireless base station 7-6 discards received data packet if it has been tampered, and if the received packet has not been tampered and the identity of VLAN-ID and source address is registered in the terminal information, it is sent to the destination terminal specified in the destination address 4-1 (12-2). At this time, the data packet is transferred in the same manner as in Embodiment 3. On the other hand, if the identity of VLAN-ID and source address is not registered in the terminal information, filtering section 16 discards the data packet.

In this embodiment, unlike the case presented in Embodiment 3, encryption is performed using only the VLAN-key and not terminal-key, therefore, those packet terminals having the same VLAN-ID can decode encrypted broadcast and multicast packets. Wireless base station and wireless packet terminal need not encrypt or decode the packet by switching between two types of encryption key so that the load on the wireless base station and wireless packet terminals is controlled.

Also, the manner of broadcast packet transfer in the packet network in this embodiment is the same as that shown in FIG. 11 in Embodiment 3.

Also, the above method of packet transfer was based on Embodiment 2, but it may be based on Embodiment 1. In such a case, as explained in Embodiment 3, terminal information table shown in Table 1 is used and it is necessary to confirm matching of the identity of VLAN-ID and source address with the terminal information.

Accordingly, in this embodiment, as in Embodiment 3, packet transfer from one packet terminal to another packet terminal can be performed by selecting an optimal routing without going through gateways, thereby preventing an increase in transfer delay time.

Additionally, this embodiment enables to perform packet transfer using the same encryption key common to respective VLAN-ID. Accordingly, it is possible for a wireless base station to send a packet, in one broadcast or multicast, to all the wireless packet terminals using the same VLAN-ID. Therefore, compared with the case of transmitting a plurality of packets to a plurality of packet terminals using different encryption keys for each terminal, traffic congestion, transfer time delay and load on the base station can be decreased.

Also, because an encryption key common to respective VLAN-ID is used, when a wireless base station or a wireless packet terminal receive a packet, decoding can be carried out without switching the encryption key. Therefore, compared with the case of packet transfer using two types of encryption keys, load on the wireless base station and wireless packet terminal can be controlled. Also, although VLAN-key is not an encryption key dedicated to a terminal, it is not able to find out other packet terminals having different VLAN-IDs, fraudulent access by pretentious packet terminal is not possible.

Embodiment 6

This embodiment is a modification of Embodiment 1, such that a VLAN-ID is dynamically assigned at the time of starting communication. The configurations of the packet network and wireless base station, tampering detection steps for data packet and packet signal format are the same as those shown in FIGS. 1, 2, 4 and 5 in Embodiment 1.

In this embodiment, to dynamically assign a VLAN-ID, each of the user LAN 1-4 is given a specific name (referred to as user LAN name). For example, in FIG. 1, LAN #A is designated by user LAN#A and LAN #B is designated by user LAN#B. Also, to retain the identities of user LAN names and VLAN-IDs, wireless base station 1-6 has a memory section for VLAN-ID assignment administration table shown in Table 4. Further, terminal authentication server 1-8 has a terminal information table shown in Table 5, which differs from Table 1 in Embodiment 1 such that user LAN names are used instead of VLAN-IDs.

TABLE 4

VLAN-ID Assignment Administration Table

| user LAN name | VLAN-ID |
|---|---|
| User LAN #A | VLAN-ID #A |
| User LAN #B | VLAN-ID #B |
| . | . |
| . | . |
| . | . |

TABLE 5

Terminal Information Table

| Terminal Address | user LAN-name | Encryption key |
|---|---|---|
| Address #1 | user LAN #A | Encryption key #a |
| Address #2 | user LAN #A | Encryption key #b |
| Address #3 | user LAN #B | Encryption key #c |

Figure 14:
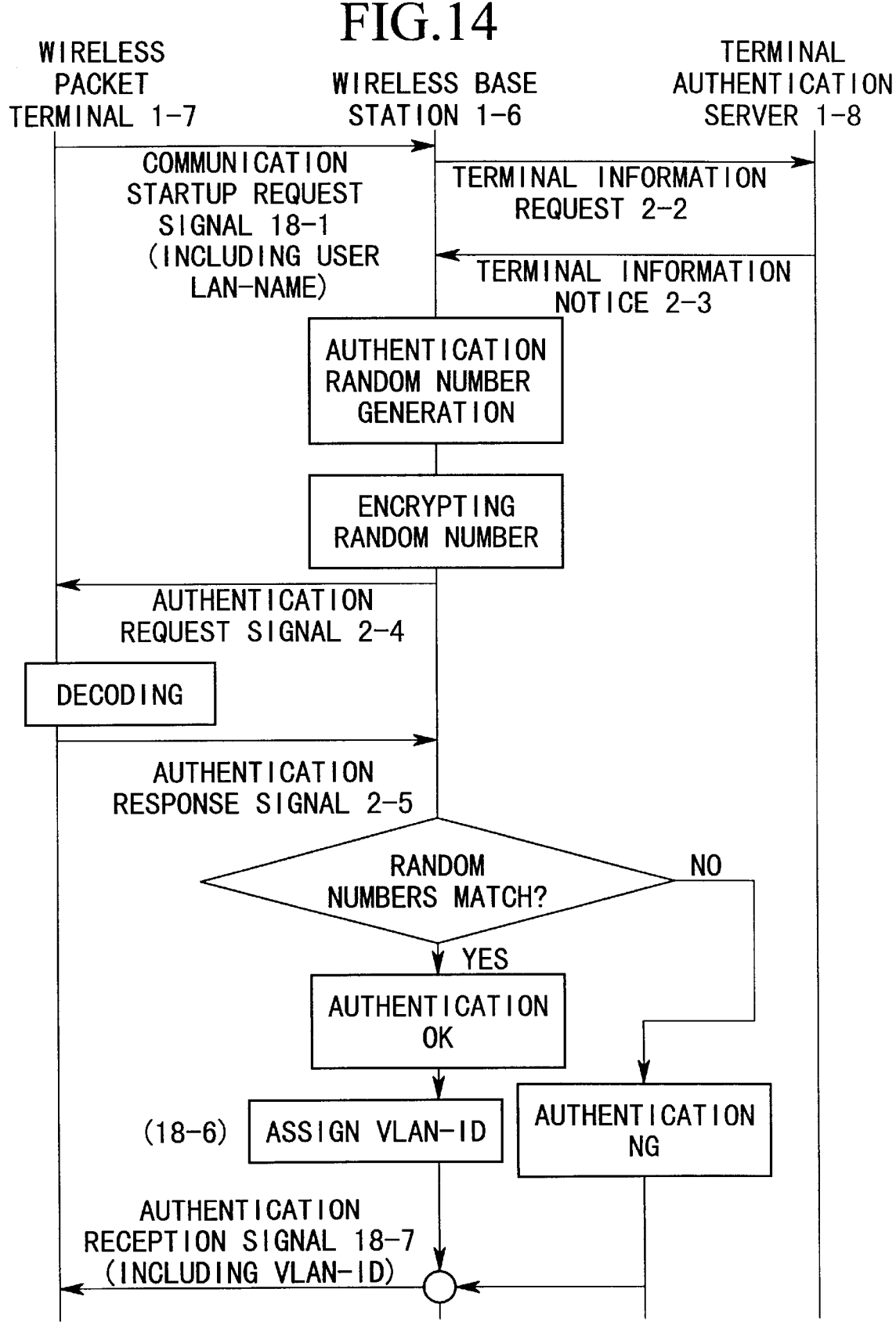
FIG. 14 is a flow diagram to show authentication steps for wireless packet communication in Embodiment 6 of the present invention.

Authentication steps for the wireless packet terminals used in this embodiment are shown in FIG. 14, which is a partly modified version of the steps shown in FIG. 3. As shown in FIG. 14, at a transfer of communication startup request signal to the wireless base station 1-6, a wireless packet terminal 1-7 forwards information including a user LAN name (for example, user LAN#A) assigned to its dedicated user LAN (18-1). The user LAN name is stored in terminal authentication section 10 of the wireless base station 1-6. Next, as in Embodiment 1, wireless base station 1-6 requests (2-2) terminal authentication server 1-8 to obtain (2-3) terminal information and memorizes the information in terminal information memory section 11. Next, wireless base station 1-6 encrypts a random number for terminal authentication and sends an authentication request signal (2-4) to wireless packet terminal 1-7, and performs terminal authentication according to an authentication response signal (2-5) returned by the wireless packet terminal 1-7.

When it is decided that the wireless packet terminal 1-7 is an authorized terminal according to the authentication steps, terminal authentication section 10 assigns (18-6) a VLAN-ID to the user LAN name being forwarded (18-1) from the wireless packet terminal 1-7. For example, if the user LAN name forwarded from wireless packet terminal 1-7 is "user LAN#A", terminal authentication section 10 assigns "VLAN-ID#A" for example to this user LAN, and as shown in Table 4, adds a set of "user LAN#A" and "VLAN-ID#A" to VLAN-ID assignment administration table. Next, terminal authentication section 10 proceeds to notify (18-7) a communication allowance to wireless packet terminal 1-7 using the authentication reception signal together with a VLAN-ID#A which has been assigned. Here, if it is decided that the wireless packet terminal 1-7 is an unauthorized terminal, processing steps are the same as those in Embodiment 1.

Figure 15:
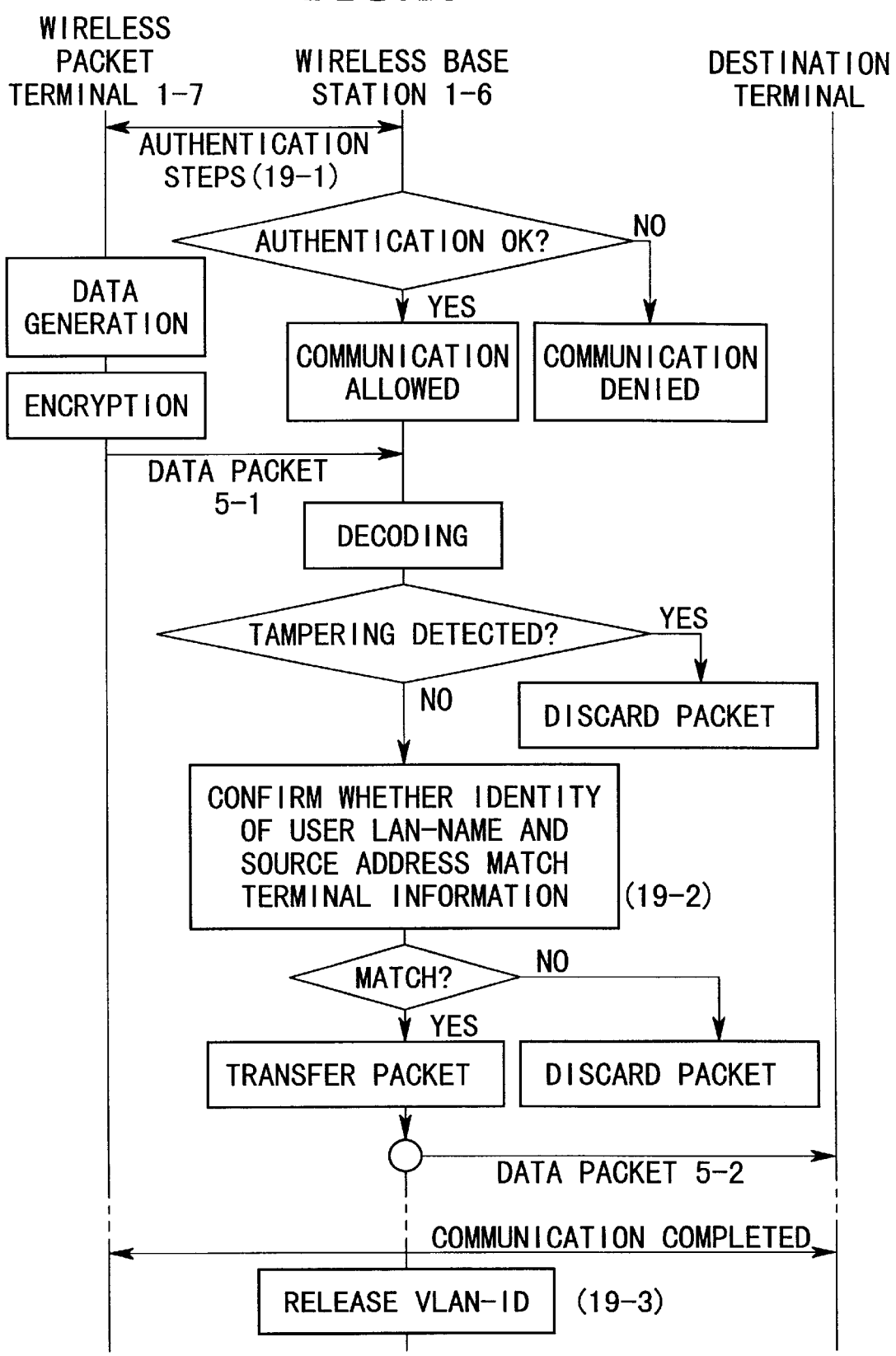
FIG. 15 is a flow diagram to show the packet transfer steps in Embodiment 6.

FIG. 15 shows packet transfer steps in this embodiment. First, according to the present embodiment, authentication steps shown in FIG. 14 are executed (19-1). Next, a wireless packet terminal 1-7 sends a data packet to wireless base station 1-6, but in this case, it uses the VLAN-ID (see FIG. 14, 18-7) 4-3 which has been notified earlier. Subsequent steps are the same as those in Embodiment 1 to perform data packet transfer step (5-2). However, after confirmation of no tampering in data packet, it checks to determine (19-2) whether the identity of user LAN and source address match those in the terminal information, by following the steps presented below. That is, in the wireless base station 1-6, terminal address/VLAN-ID comparison section 15 obtains user LAN name corresponding to source address 4-2 from the terminal information table shown in Table 5, and searches for a VLAN-ID to correspond to the obtained user LAN name in the VLAN-ID assignment administration table shown in Table 4, and compares the found VLAN-ID with VLAN-ID 4-3 included in the data packet to determine if they match. Depending on the result, filtering section 16 sends the data packet when the two identities match, and transfers (5-2) the data packet to the destination terminal specified by destination address 4-1, and if the two do not match, the data packet is discarded. Subsequently, when communication between wireless packet terminal 1-7 and the destination terminal is completed, terminal authentication section 10 in wireless base station 1-6 deletes the set of user LAN#A and VLAN-ID#A from the VLAN-ID assignment administration table shown in Table 4, thereby releasing VLAN-ID assigned to wireless packet terminal 1-7 (19-3) for use in other packet transfers.

Accordingly, this embodiment is based on assigning a VLAN-ID dynamically to wireless packet terminal 1-7, therefore, a limited number of VLAN-IDs can be re-used effectively, thereby enabling to accommodate a larger number of user LANs.

Embodiment 7

In this embodiment, dynamic allocation of VLAN-ID explained in Embodiment 6 is applied to Embodiment 2. Therefore, the configurations of the packet network and wireless base station, tampering detection steps for data packet and packet signal format are the same as those shown in FIGS. 1, 2, 4 and 5 in Embodiment 1.

In this embodiment, terminal authentication server 1-8 stores terminal information table shown in Table 6. Compared with Table 5 (Embodiment 6), a plurality of user LAN names are registered for each terminal address. Here, a packet terminal having each terminal address is permitted to communicate with user LANs to correspond to these user LAN names.

TABLE 6

Terminal Information Table

| Terminal Address | user LAN-name | user LAN-name | Encryption key |
|---|---|---|---|
| Address #1 | user LAN #A | user LAN #B | Encryption key #a |
| Address #2 | user LAN #A | user LAN #B | Encryption key #b |
| Address #3 | user LAN #B | — | Encryption key #c |

Figure 16:
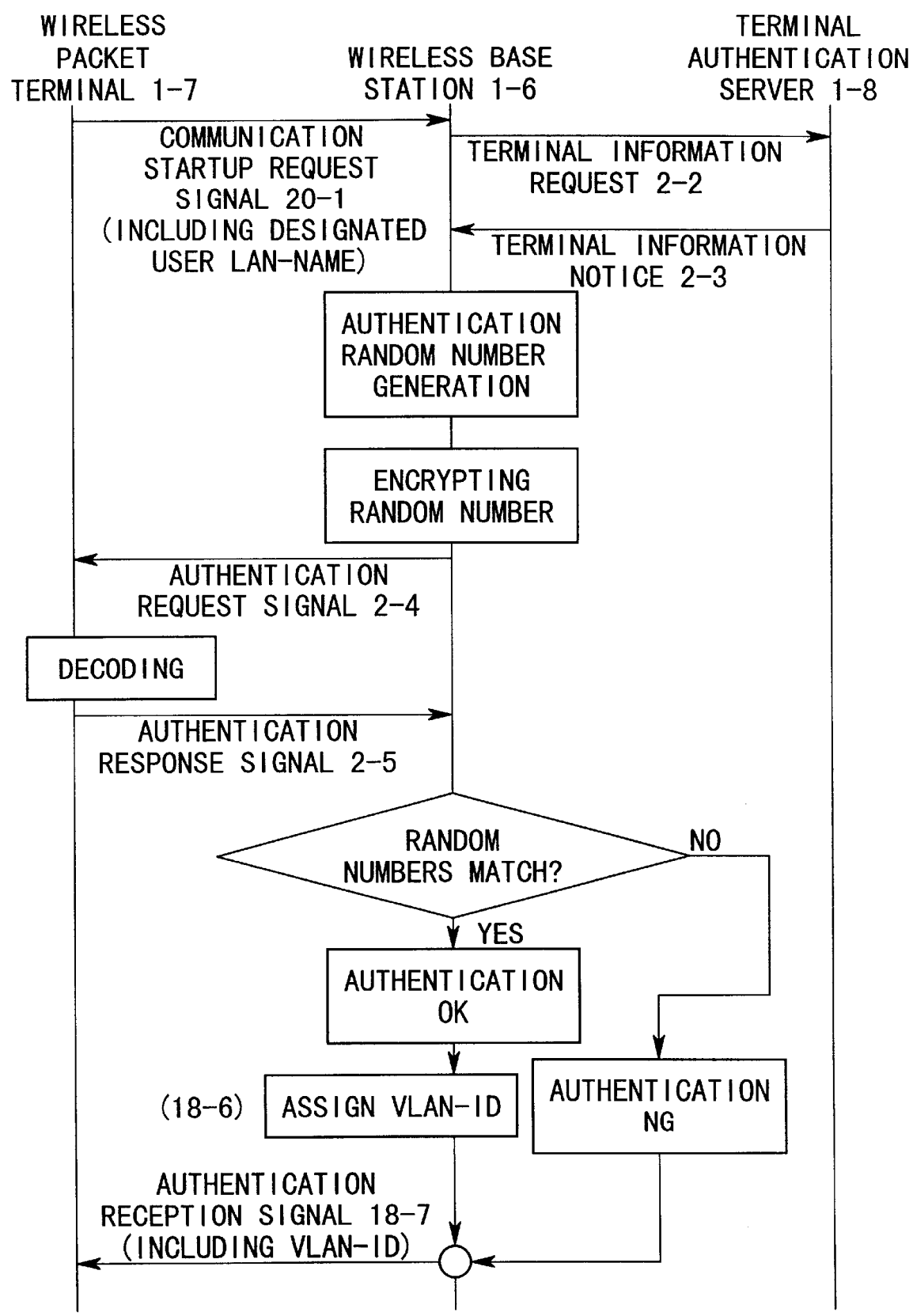
FIG. 16 is a flow diagram to show the authentication steps for wireless packet communication in Embodiment 7 of the present invention.

FIG. 16 shows authentication steps to authenticate a wireless packet terminal used in this embodiment. The difference in the steps shown in FIGS. 14(Embodiment 6) and 16 is that, when wireless packet terminal 1-7 transmits communication startup request signal to wireless base station 1-6, receiver user LAN name is designated and sent to wireless base station 1-6 (20-1). Therefore, all subsequent authentication steps are the same as those in Embodiment 6.

Figure 17:
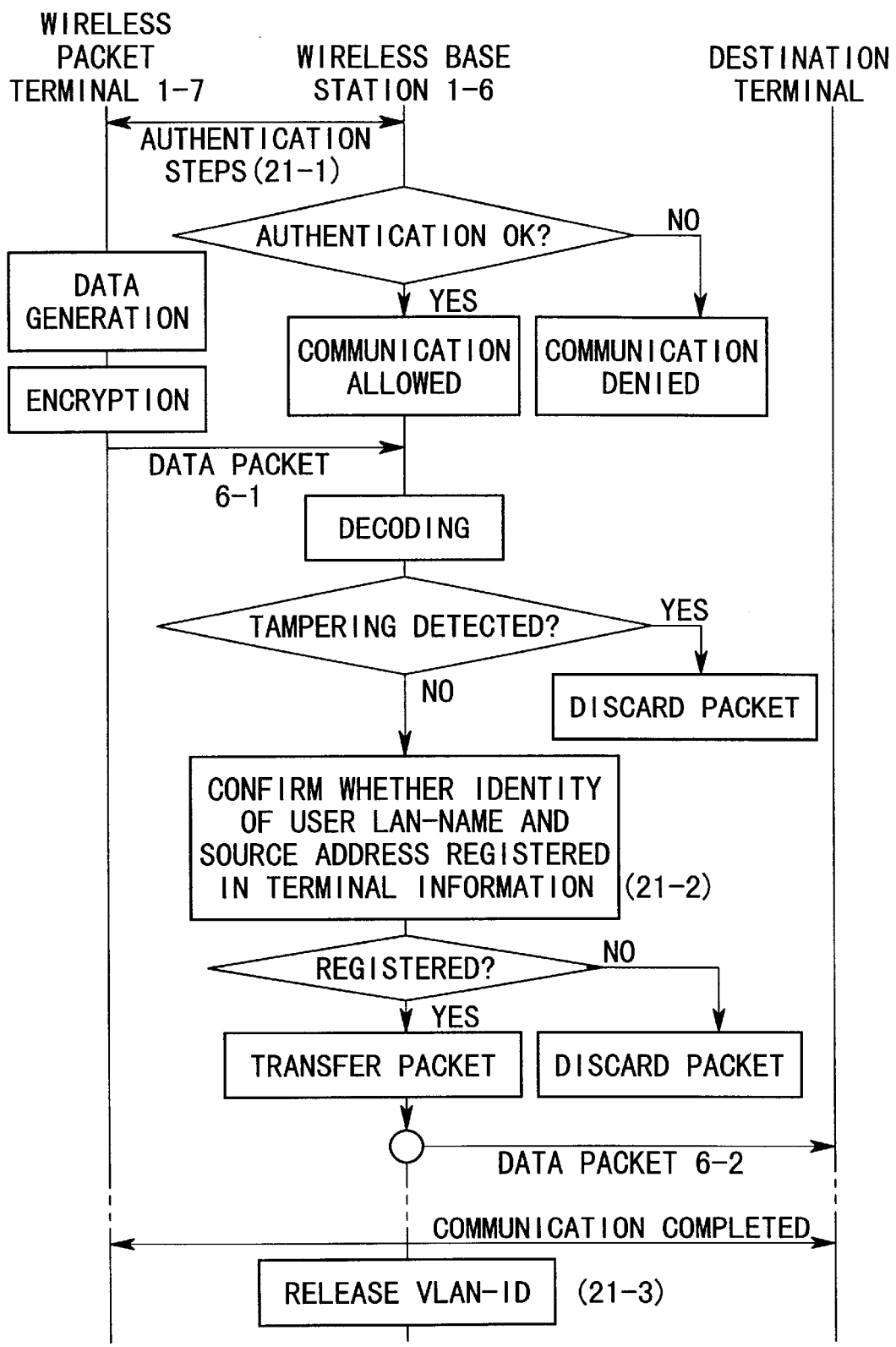
FIG. 17 is a flow diagram to show the packet transfer steps in Embodiment 7.
Figure 18:
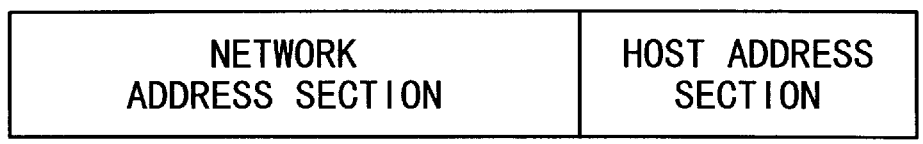
FIG. 18 is a schematic diagram of the IP address configuration.

FIG. 17 shows packet transfer steps used in this embodiment. In this embodiment, terminal authentication steps are the same as those shown in FIG. 16 (21-1). Next, wireless packet terminal 1-7 forwards data packet to wireless base station 1-6. At this time, VLAN-ID 4-3 contained in the data packet is the VLAN-ID pre-assigned earlier (FIG. 16, 18-7). Subsequent steps to data packet transfer to the destination terminal (6-2) are the same as those in Embodiment 2. If the data packet is not tampered, it checks whether the identity of user LAN name and source address is registered in the terminal information (21-2). This step is performed as follows. Terminal address/VLAN-ID comparison section 15 in the wireless base station 1-6 searches for the user LAN name to correspond to VLAN-ID 4-3 included in the received packet in VLAN-ID assignment administration table shown in Table 4. Next, it examines whether the set of identify of the user LAN name found from the search and the source address 4-2 can be found in the sets of terminal addresses and user LAN names in the terminal information table shown in Table 6. If the set is not found in the terminal information table, it decides that the identity has not been registered in the terminal information. On the other hand, if the set is found in the terminal information table, terminal address/VLAN-ID comparison section 15 obtain a VLAN-ID to be assigned to the current user LAN name from the VLAN-ID assignment administration table shown in Table 4, and checks if the obtained VLAN-ID matches the VLAN-ID 4-3 in the received packet, and if they match, it is decided that the identity is registered in the terminal information. If they do not match, it is decided that the identity is not registered in the terminal information. Based on such decision, filtering section 16 sends (6-2) the data packet when the identity is registered in the terminal information, and transfers (5-2) the data packet to the destination terminal specified by destination address 4-1, and if the identity is not registered in the terminal information, the data packet is discarded. When communication between wireless packet terminal 1-7 and destination terminal is completed, terminal authentication section 10 releases (21-3) VLAN-ID assigned to the wireless packet terminal 1-7, as in Embodiment 6.

Embodiment 8

Figure 19:
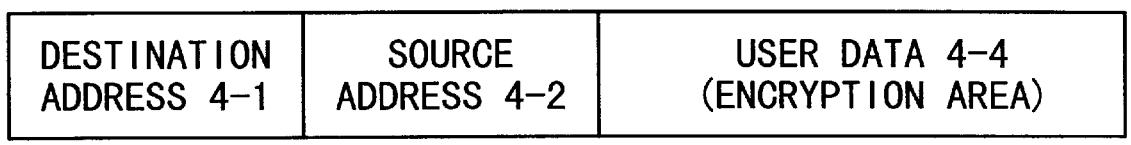
FIG. 19 is a schematic diagram to show the packet signal format in Embodiment 8 of the present invention.

In the embodiments presented so far, terminal addresses are given MAC addresses and user LANs are assigned VLAN-IDs. In this embodiment, terminal addresses are IP addresses and each user LAN 1-4 is pre-assigned a specific network address. As explained earlier, IP addresses are structured as shown in FIG. 18, and in this embodiment, the network address section included in the IP address is used instead of VLAN-ID. In other words, in the present embodiment, network address is obtained by extracting upper bits in the destination address 4-1 in the data packet. Therefore, VLAN-ID 4-3 shown in FIG. 5 becomes unnecessary, and the signal format used in this embodiment becomes the one shown in FIG. 19.

Terminal information table in this embodiment is shown in Table 7, indicating that network address is used instead of VLAN-ID used in Table 1. Further, wireless packet terminal 1-7 in this embodiment pre-registers network address of its subscribing user LAN 1-4 in the terminal authentication server 1-8. The configurations of the packet network and wireless base station, authentication steps of wireless packet terminals, and tampering detection steps for data packet are the same as those shown in FIGS. 1~4 in Embodiment 1.

TABLE 7

Terminal Information Table

| Terminal Address | Network Address | Encryption key |
|---|---|---|
| Address #1 | Network Address #A | Encryption key #a |
| Address #2 | Network Address #A | Encryption key #b |
| Address #3 | Network Address #B | Encryption key #c |

Figure 20:
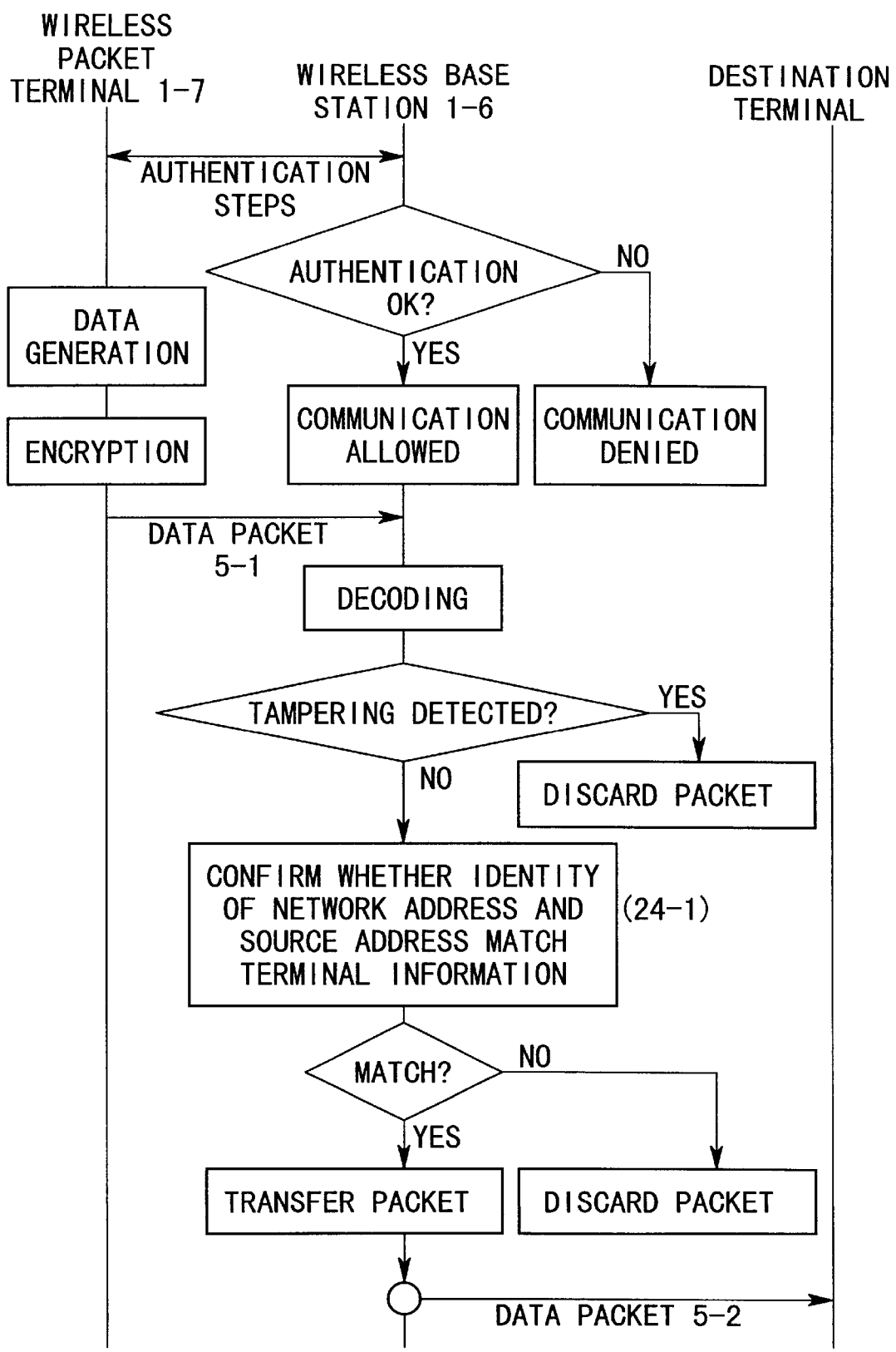
FIG. 20 is a flow diagram to show the packet transfer steps in Embodiment 8.

FIG. 20 shows packet transfer steps used in this embodiment, and the difference between the present steps and the steps shown in FIG. 6 (Embodiment 1) is as follows. In wireless base station 1-6, if packet tampering detection section 14 does not detect any tampering in the received data packet (5-1), terminal address/VLAN-ID comparison section 15 extracts network address section from the destination address 4-1 in the received data packet, and based on source address 4-2, obtains network address of the subscribing user LAN of the wireless packet terminal from the terminal information table shown in Table 7, and confirms if the two network addresses match (24-1). Filtering section 16, depending on the forwarded confirmation result, transfers data packet (5-2) to the destination terminal specified by the destination address 4-1, as in Embodiment 1. On the other hand, if the two network addresses do not match, filtering section 16 discards the data packet.

Accordingly, in this embodiment, it is not necessary to provide an extra field in the data packet such as VLAN-ID used in Embodiment 1.

Embodiment 9

In this embodiment, the use of network address used in Embodiment 8 is applied to Embodiment 2. In this embodiment also, each user LAN 1-4 is pre-assigned with a specific network address. Also, terminal information table in this embodiment is as shown in Table 8, and uses network address instead of VLAN-ID shown in Table 2. Also, the configurations of the packet network and wireless base station, authentication steps of wireless packet terminals, tampering detection steps for data packet and packet signal format are the same as those shown in FIGS. 1~4 and FIG. 19.

TABLE 8

Terminal Information Table

| Terminal Address | Network Address | Network Address | Encryption key |
|---|---|---|---|
| Address #1 | Network address #A | Network address #B | Encryption key #a |
| Address #2 | Network address #A | Network address #B | Encryption key #b |
| Address #3 | Network address #B | — | Encryption key #c |

Figure 21:
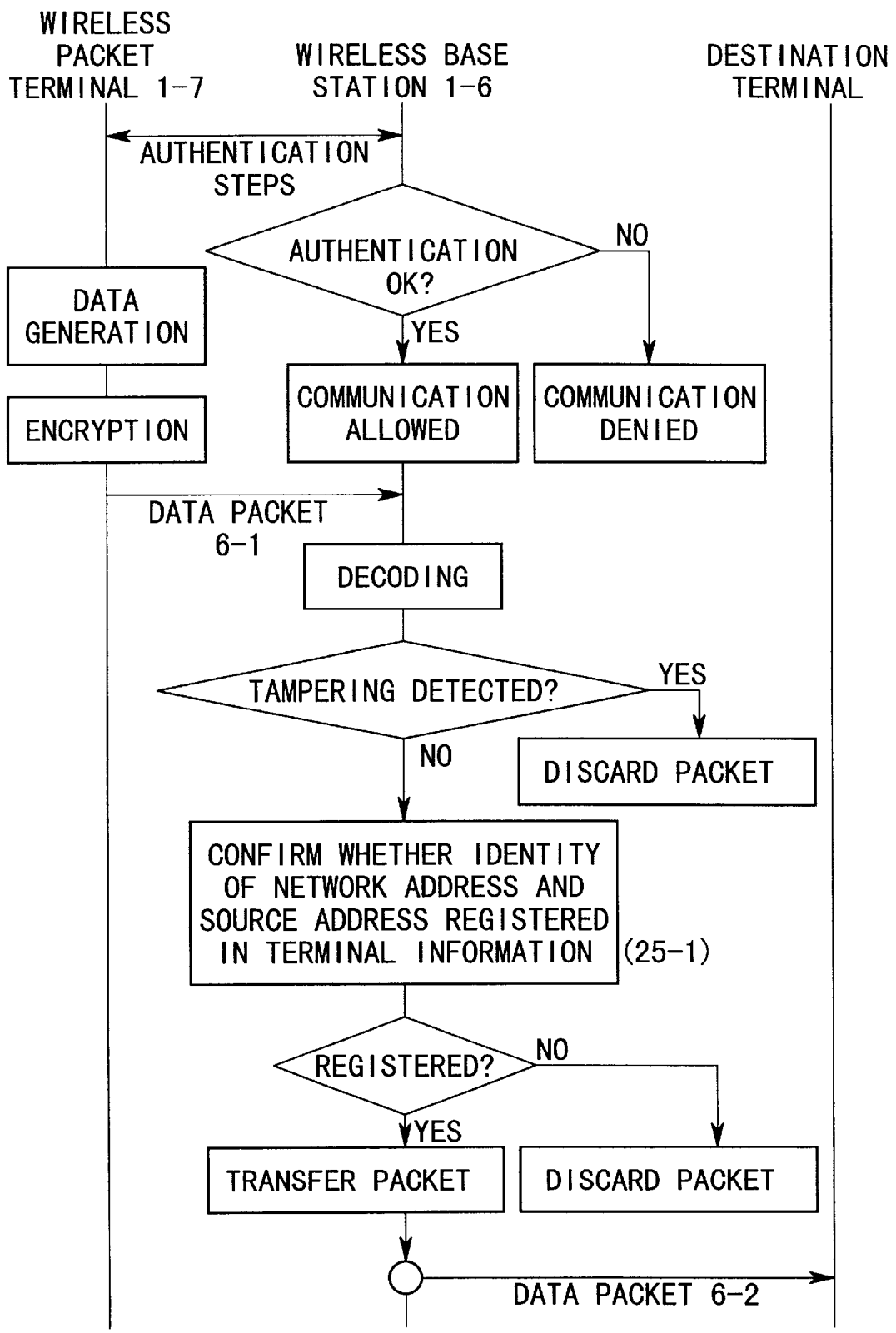
FIG. 21 is a flow diagram to show the packet transfer steps in Embodiment 9 of the present invention.

FIG. 21 shows packet transfer steps used in this embodiment. The difference between the present steps and the packet transfer steps shown in FIG. 7 (Embodiment 2) is as follows. In the wireless base station 1-6, if the packet tampering detection section 14 does not detect any tampering in the received data packet (6-1), terminal address/VLAN-ID comparison section 15 extracts network address section from the destination address 4-1 in the received data packet, and based on source address 4-2, obtains from the terminal information table shown in table 8 all the network addresses assigned to the user LANs that are permitted to communicate with wireless packet terminal 1-7. Next, terminal address/VLAN-ID comparison section 15 confirms whether the network address extracted from the destination address 4-1 matches with any of the obtained network addresses. Based on the confirmation result forwarded to filtering section 16, if there is matching network address, the data packet is sent (6-2) to the destination terminal specified in destination address 4-1, and if there is no matching network address, the data packet is discarded.

Accordingly, in this embodiment also, it is not necessary to provide an extra field such as VLAN-ID in the data packet as in Embodiment 1.

Embodiment 10

In this embodiment, the use of network address used in Embodiment 8 is applied to Embodiment 3. In this embodiment also, each user LAN 1-4 is pre-assigned with a specific network address. The configuration of the packet network in this embodiment is the same as that in Embodiment 3 shown in FIG. 8. Also, the configurations of the wireless base station, authentication steps of wireless packet terminals, tampering detection steps for data packet and packet signal format are the same as those shown in FIGS. 2~4 and FIG. 19. Also, terminal authentication server 7-8 has a VLAN information table shown in Table 9, and the difference between this embodiment and Embodiment 3 (refer to Table 3) is that network address is used instead of VLAN-ID. In this embodiment also, wireless packet network notifies of a VLAN-key to each wireless packet terminal 7-7, as in Embodiment 3.

TABLE 9

VLAN Information Table

| Network Address | VLAN-key |
|---|---|
| Network Address #A | VLAN-key #a |
| Network Address #B | VLAN-key #b |

Figure 22:
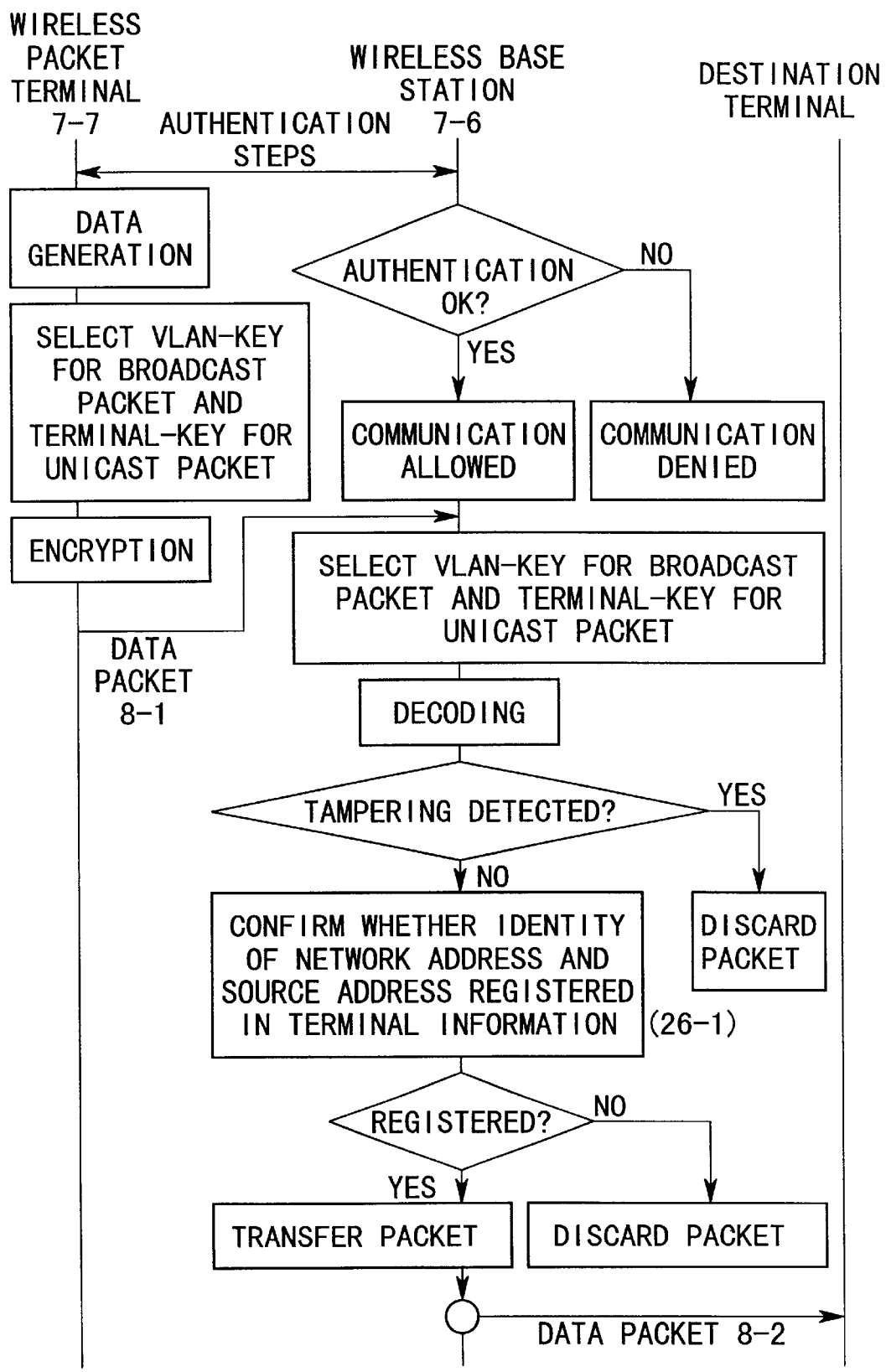
FIG. 22 is a flow diagram to show the packet transfer steps in Embodiment 10 of the present invention.

FIG. 22 shows packet transfer steps used in this embodiment. The difference between these steps and the steps shown in FIG. 9 for Embodiment 3 is explained below. First, when tampering is not detected in the received data packet (8-1), as in Embodiment 9, terminal address/VLAN-ID comparison section 15 confirms (26-1) whether the network address extracted from the destination address 4-1 of the received data packet is registered in the network addresses assigned to the plurality of user LAN 1-4 that are permitted to communicate with wireless packet terminal 7-7. Filtering section 16 decides whether or not to discard or transfer (8-2) the packet based on the confirmation results.

Here, when transferring data packet (8-2), if the destination terminal is connected to the user LAN 7-4, each relay node 7-9 selects next transmission port according to the destination address 4-1 in the data packet, and transfers the data packet to gateway 7-3. Gateway 7-3 selects, according to the network address extracted from the destination address 4-1, either gateway 7-1 or gateway 7-2, and transfers the data packet from user LAN 7-4 to the destination terminal. On the other hand, if the destination terminal is connected to wireless packet network, each relay node 7-9 selects a transmission port, according to the destination address 4-1, and transfers data packet to the destination terminal without going through gateways, as in Embodiment 3.

Broadcast packet transfer steps in this embodiment are basically the same as those in Embodiment 3 (refer to FIG. 10), and the difference is that path selection is performed using the network address extracted from the destination address instead of VLAN-ID.

Therefore, in this embodiment also, there is no need to provide for extra field in the data packet as was required in Embodiment 1.

Further, this embodiment illustrated a case of using network address in Embodiment 3, but Embodiment 3 and Embodiments 4~5 differ only in the manner of using the encryption key when transmitting data packet from wireless packet terminal 7-7 to wireless base station 7-6. Therefore, the use of network address instead of VLAN-ID is applicable also to Embodiments 4~5.

Embodiment 11

Figure 23:
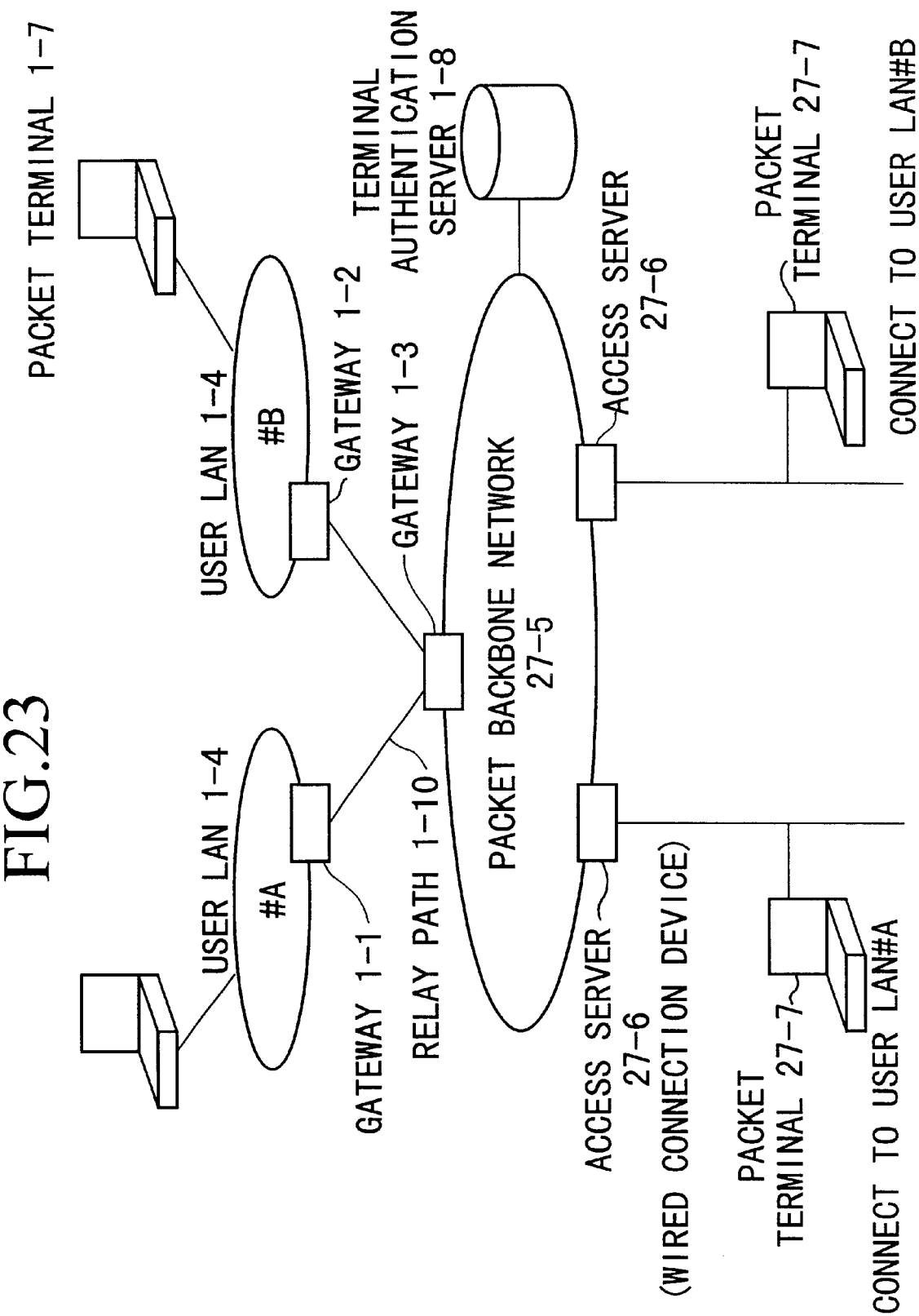
FIG. 23 is a block diagram of the configuration of the wired packet communication network in Embodiment 11 of the present invention.

The foregoing embodiments are applications of the present invention to wireless packet network, but the present invention is not limited to wireless packet network and is applicable also to wired packet network. FIG. 23 shows a network produced by applying the wireless configuration of Embodiment 1 to this embodiment of a wired configuration. The wired network is comprised by: a packet backbone network 27-5 which is equivalent in function to the wireless backbone network 1-5; access servers (wired connection device) 27-6 which is equivalent in function to wireless base stations 1-6 except for the aspect of wireless or wired connections; and packet terminals 27-7 which is equivalent in function to wireless packet terminals 1-7, except for the aspect of wireless or wired connections. All other structural aspects of the network are the same as those in Embodiment 1 (refer to FIG. 1). Packet transfer steps in this embodiment are also the same as those in Embodiment 1, except for the fact that all the communications, including that between access server 27-6 and packet terminal 27-7, are performed through wired connections. Also, when using the network configuration shown in FIG. 8, wireless packet backbone network 7-5, wireless base stations 7-6, and wireless packet terminals 7-7 should be replaced with packet backbone network 27-5, access servers 27-6, and packet terminals 27-7. Therefore, wired packet network configuration can be applied to all the foregoing embodiments.

The foregoing embodiments are meant to demonstrate the present invention in an illustrative manner and not in a restrictive manner, and it is obvious that the present invention can be embodied in a variety of other examples and modifications. Therefore, the present invention is only limited by the range of claims and their equivalents.

For example, in each of the foregoing embodiments, the wireless base station (or access server) performed terminal authentication, packet tampering detection because it is the entry point to the packet network and is able to control data packet transfer in a most efficient manner. However, depending on the configuration of the packet network, a control station may be provided to direct wireless base stations, and in such a case, the control station may be asked to perform terminal authentication and packet tampering detection.

What is claimed is:

1. A method for packet transfer using a packet communication in a packet network comprised by base stations and a packet backbone network connecting said base stations, wherein each base station accommodates a plurality of packet terminals and said packet backbone network is connected to a plurality of other packet networks served by local area networks, termed user LANs, and wherein a packet terminal with a specific terminal address forwards a packet with an attachment, including a terminal address of a destination terminal as a destination address and a terminal address of said packet terminal as a source address, to said packet network which delivers said packet according to said destination address; said method comprising the steps of:

said packet network authenticating said packet terminal starting a communication through said base station; and if said packet terminal is an authorized packet terminal, said packet terminal encrypting data to be transmitted and forwarding a packet including said encrypted data to said packet network with an attachment, including an identifier assigned to a user LAN to which said destination terminal subscribes, said destination address and said source address; and said packet network receiving said packet, and decoding said encrypted data in said received packet and searching for tampering, and if said received packet has not been tampered, transmitting said received packet to said user LAN according to said source address and said identifier included in said received packet, only when said packet terminal is approved for communicating with said user LAN having said identifier included in said received packet, and discarding said received packet when said packet terminal is not approved for communicating with said user LAN.

2. A method for packet transfer using a packet communication in a packet network comprised by base stations and a packet backbone network connecting said base stations, wherein each base station accommodates a plurality of packet terminals and said packet backbone network is connected to a plurality of other packet networks served by local area networks, termed user LANs, and wherein a packet terminal with a specific terminal address forwards a packet with an attachment, including a terminal address of a destination terminal as a destination address and a terminal address of said packet terminal as a source address, to said packet network which delivers said packet according to said destination address; said method comprising the steps of:

pre-assigning a specific identifier to each of user LANs;

said packet network storing, beforehand, terminal information containing said terminal addresses, said identifiers assigned to one and more user LANs approved for communication, and information necessary for terminal authentication;

said packet network, when said packet terminal starts a communication through said base station, authenticating said packet terminal based on said information necessary for terminal authentication, and if said packet terminal is an authorized terminal, notifying an allowance for communication to said packet terminal; and when said allowance for communication is informed, said authorized packet terminal selecting a user LAN from said one and more user LANs, and encrypting data to be transmitted and forwarding a packet including said encrypted data to said packet network with an attachment, including said identifier assigned to said user LAN selected, said destination address and said source address;

said packet network receiving said packet, and decoding said encrypted data in said received packet and searching for tampering, and if tampering is detected, discarding said received packet, while if tampering is not detected, examining whether an identity of said source address and said identifier included in said received packet is registered in said terminal information, and if said identity is registered, transferring said received packet to said destination address, and if said identity is not registered, discarding said received packet.

3. A method according to claim 2, wherein said packet backbone network and said user LANs are connected through gateways, and when transferring said received packet to said destination address, said gateways select a user LAN according to said identifier included in said received packet so as to transfer said packet to said destination address through said user LAN selected.

4. A method according to claim 2, wherein said identifier is provided separately from said destination address and said source address in said packet.

5. A method according to claim 2, wherein said identifier is obtained by extracting a portion of said destination address in said packet.

6. A method according to claim 5, wherein said terminal address is an IP address having a network address and a host address, and said identifier is identical to said network address.

7. A method according to claim 2, wherein said packet backbone network includes a plurality of relay nodes having a function of selecting routing paths and relaying said packet for transferring said packet to said destination address, and said packet network selects routing paths using routing information comprised by said destination address and said identifier in said packet, further comprising the steps of:

when a unicast packet is to be transferred, if said destination terminal is connected to said packet network, said packet network delivering said unicast packet to said destination terminal according to successively chosen relay nodes based on said destination address, and otherwise if said destination terminal is not connected to said packet network, said packet network delivering said unicast packet to said user LAN according to successively chosen relay nodes based on said identifier; and when a broadcast or a multicast packet are to be transferred, said packet network transferring said broadcast or said multicast packet to successively chosen relay nodes according to said identifier, thereby delivering said broadcast or said multicast packet to all packet terminals which communicate using said identifier as well as to said user LAN specified by said identifier.

8. A method according to claim 7, wherein said packet backbone network is connected to a plurality of user LANs through gateways, and further comprising the steps of said gateways selecting and transferring said packet to a user LAN selected according to said identifier contained in said packet.

9. A method according to claim 7, wherein, in transferring a packet, said unicast packet is encrypted and decoded using an encryption key assigned to each packet terminal, and said broadcast or said multicast packet is encrypted and decoded using an encryption key provided to each identifier.

10. A method according to claim 7, wherein when said unicast packet is to be transferred or said packet terminal is transmitting said broadcast packet or said multicast packet, encryption and decoding are carried out using an encryption key assigned to each packet terminal, while when said base station is transferring said broadcast packet or said multicast packet, encryption and decoding are carried out using an encryption key assigned to each identifier.

11. A method according to claim 7, wherein encryption and decoding are carried out using an encryption key assigned to each identifier.

12. A method according to claim 7, wherein said identifier is provided separately from said destination address and said source address in said packet.

13. A method according to claim 7, wherein said identifier is obtained by extracting a portion of said destination address in said packet.

14. A method according to claim 13, wherein said terminal address is an IP address having a network address and a host address, and said identifier is identical to said network address.

15. A method for packet transfer using a packet communication in a packet network comprised by base stations and a packet backbone network connecting said base stations, wherein each base station accommodates a plurality of packet terminals and said packet backbone network is connected to a plurality of other packet networks served by local area networks, termed user LANs, and wherein a packet terminal with a specific terminal address forwards a packet with an attachment, including a terminal address of a destination terminal as a destination address and a terminal address of said packet terminal as a source address, to said packet network which delivers said packet according to said destination address; said method comprising the steps of:

pre-assigning a specific user LAN-name to each user LAN;

said packet network storing, beforehand, terminal information containing said terminal addresses, said user LAN-names assigned to one and more user LANs approved for communication, and information necessary for terminal authentication;

said packet terminal, at a startup of a communication through said base station, selecting a user LAN from said one and more user LANs, and notifying to said packet network a user LAN-name assigned to said user LAN selected;

said packet network authenticating said packet terminal based on said information necessary for terminal authentication, and if said packet terminal is an authorized terminal, assigning an identifier for identifying each user LAN to said user LAN-name notified from said packet terminal, and notifying said identifier to said packet terminal;

said packet terminal encrypting data to be transmitted and forwarding a packet including said encrypted data to said packet network with an attachment, including said identifier assigned to said user LAN selected, said destination address and said source address;

said packet network receiving said packet, and decoding said encrypted data in said received packet and searching for tampering, and if tampering is detected, discarding said received packet, while if tampering is not detected, examining whether an identity of said user LAN-name assigned with said identifier included in said received packet and said source address included in said received packet is registered in said terminal information, and if said identity is registered, transferring said received packet to said destination address, and if said identity is not registered, discarding said received packet; and said packet network releasing said identifier assigned specifically to said user LAN-name when said packet terminal has completed packet communication.

16. A method according to claim 15, wherein said packet backbone network and said user LANs are connected through gateways, and when transferring said received packet to said destination address, said gateways select a user LAN according to said identifier included in said received packet so as to transfer said packet to said destination address through said user LAN selected.

17. A base station for accommodating a plurality of packet terminals and is connected to a packet backbone network connected to other packet networks served by local area networks, termed user LANs, said base station comprising:

a terminal information memory section for storing specific terminal addresses assigned to individual packet terminals, identifiers assigned to each of one and more user LANs approved for communicating with each of packet terminals, and information necessary for terminal authentication;

a terminal authentication section, in response to a communication startup request from said packet terminal, for authenticating said packet terminal based on said information necessary for terminal authentication, and notifying an authentication result to said packet terminal;

a packet encryption section for encrypting, using said information necessary for terminal authentication, a data section in a packet to be exchanged between said packet backbone network and said packet terminal;

a packet decoding section for receiving from said packet terminal a packet containing an encrypted data with an attachment including a terminal address of a destination terminal as a destination address, a terminal address of said packet terminal as a source address, and an identifier assigned to said user LAN, and for decoding said encrypted data;

a tampering detection section for detecting tampering in decoded data and discarding said packet;

a comparison section for checking whether a set of said source address and said identifier included in said packet is registered in a plurality of sets of terminal addresses and identifiers stored in said terminal information memory section; and a filtering section, basing a decision on a result of comparison by said comparison section, for transferring said packet to said destination address when said set is registered, and discarding said packet when said set is not registered.

18. A base station according to claim 17, wherein when a sending packet is a unicast packet, said packet encryption section performs encryption using an encryption key assigned to each packet terminal, while said packet encryption section uses an encryption key assigned to each identifier when said sending packet is a broadcast packet or a multicast packet; and said packet decoding section decodes using said encryption key assigned to each packet terminal when a received packet is a unicast packet, and uses said encryption key assigned to each identifier when said received packet is a broadcast packet or a multicast packet.

19. A base station according to claim 17, wherein said packet encryption section performs encryption using an encryption key assigned to each packet terminal when a sending packet is a unicast packet, but uses an encryption key assigned to each identifier when said sending packet is a broadcast packet or a multicast packet; and said packet decoding section performs decoding using said encryption key assigned to each packet terminal.

20. A base station according to claim 17, wherein said packet encryption section encrypts a data section in a packet to be sent using an encryption key assigned to each identifier; and said packet decoding section decodes a data section in a received packet using an encryption key assigned to each identifier.

21. A base station according to claim 17, wherein said identifier is provided separately from said destination address and said source address in said packet.

22. A base station according to claim 17, wherein said identifier is obtained by extracting a portion of said destination address in said packet.

23. A base station according to claim 22, wherein said terminal address is an IP address having a network address and a host address, and said identifier is identical to said network address.

24. A base station for accommodating a plurality of packet terminals and is connected to a packet backbone network connected to other packet networks served by local area networks, termed user LANs, said base station comprising:

a terminal information memory section for storing specific terminal addresses assigned to individual packet terminals, user LAN-names assigned to each of one and more user LANs approved for communicating with each of packet terminals, and information necessary for terminal authentication;

a terminal authentication section, in response to a communication startup request from said packet terminal, for authenticating said packet terminal based on said information necessary for terminal authentication, and notifying an authentication result to said packet terminal, and for an authorized packet terminal, assigning an identifier to said user LAN-name wherein said identifier discriminates each user LAN and is notified from said packet terminal at said communication startup request, and notifying said identifier to said authorized packet terminal, and releasing said identifier allocated to said user LAN-name when said packet terminal has completed packet communication;

a packet encryption section for encrypting, using said information necessary for terminal authentication, a data section in a packet to be exchanged between said packet backbone network and said packet terminal;

a packet decoding section for receiving from said packet terminal a packet containing an encrypted data with an attachment including a terminal address of a destination terminal as a destination address, a terminal address of said packet terminal as a source address, and said identifier, and for decoding said encrypted data;

a tampering detection section for detecting tampering in decoded data and discarding said packet;

a comparison section for checking whether a set of said user LAN-name assigned with said identifier in said received packet and said source address included in said received packet is registered in a plurality of sets of user LAN-names and terminal addresses in said terminal information memory section; and a filtering section, basing a decision on a result of comparison by said comparison section, for transferring said packet to said destination address when said set is registered, and discarding said packet when said set is not registered.

* * * * *